(12) United States Patent
Sanocki et al.

(10) Patent No.: US 10,831,614 B2
(45) Date of Patent: Nov. 10, 2020

(54) VISUALIZING RESTORATION OPERATION GRANULARITY FOR A DATABASE

(71) Applicant: Amazon Technologies, Inc., Seattle, WA (US)

(72) Inventors: Elizabeth Sanocki, Seattle, WA (US); Jonathan James Pezzino, Seattle, WA (US); Manish Dalwadi, Seattle, WA (US); Anurag Windlass Gupta, Atherton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 74 days.

(21) Appl. No.: 15/676,933

(22) Filed: Aug. 14, 2017

(65) Prior Publication Data

US 2018/0018241 A1 Jan. 18, 2018

Related U.S. Application Data

(63) Continuation of application No. 14/462,305, filed on Aug. 18, 2014, now Pat. No. 9,734,021.

(51) Int. Cl.
*G06F 17/00* (2019.01)
*G06F 11/14* (2006.01)
(Continued)

(52) U.S. Cl.
CPC .......... *G06F 11/1469* (2013.01); *G06F 11/14* (2013.01); *G06F 11/1464* (2013.01);
(Continued)

(58) Field of Classification Search
CPC ............. G06F 11/1469; G06F 2201/84; G06F 11/1451; G06F 2201/805; G06F 2201/80
See application file for complete search history.

(56) References Cited

U.S. PATENT DOCUMENTS 5,586,264 A 12/1996 Belknap et al.
5,615,364 A 3/1997 Marks
(Continued)

FOREIGN PATENT DOCUMENTS

| CN | 104750773 | 7/2015 |
| JP | 2014141343 | 8/2014 |
| WO | 2012168365 | 12/2012 |

OTHER PUBLICATIONS

"Cloud Spanner: TrueTime and External Consistency", Retrieved from URL: https://cloud.google.com/spanner/docs/true-time-external-consistency on Feb. 28, 2018, pp. 1-6.
(Continued)

*Primary Examiner* — Truong V Vo
(74) *Attorney, Agent, or Firm* — Robert C. Kowert; Kowert, Hood, Munyon, Rankin & Goetzel, P.C.

(57) ABSTRACT

A database may provide a visualization of restoration operation granularity. Information may be obtained describing possible restoration points within a given period of time for a database. The information may include a respective state of the database associated with a point in time and a respective restoration operation type for the possible restoration points. A graphical representation may be generated illustrating the possible restoration points ordered within the given time period according to the points in time associated with the respective states of the database. The graphical representation may be provided via network-based interface to a client of the database. The graphical representation of the possible restoration points may be updated in response to changes to the given time period or database volume events that modify the possible restoration points.

20 Claims, 13 Drawing Sheets

(51) Int. Cl.
*H04L 12/24* (2006.01)
*H04L 12/26* (2006.01)
*G06F 3/0482* (2013.01)
*G06T 11/20* (2006.01)

(52) U.S. Cl.
CPC ...... *G06F 11/1471* (2013.01); *H04L 41/0654* (2013.01); *H04L 41/22* (2013.01); *G06F 3/0482* (2013.01); *G06F 2201/84* (2013.01); *G06T 11/206* (2013.01); *G06T 2200/24* (2013.01); *H04L 41/5009* (2013.01); *H04L 43/08* (2013.01)

(56) References Cited

U.S. PATENT DOCUMENTS

| | | |
|---|---|---|
| 5,692,177 A | 11/1997 | Miller |
| 5,768,527 A | 6/1998 | Zhu et al. |
| 5,813,009 A | 9/1998 | Johnson et al. |
| 5,842,222 A | 11/1998 | Nishimura et al. |
| 5,991,772 A | 11/1999 | Doherty et al. |
| 6,085,200 A | 7/2000 | Hill et al. |
| 6,161,109 A | 12/2000 | Matamoros et al. |
| 6,272,598 B1 | 8/2001 | Arlitt et al. |
| 6,374,266 B1 | 4/2002 | Shnelvar |
| 6,397,351 B1 | 5/2002 | Miller et al. |
| 6,505,216 B1 | 1/2003 | Schutzman et al. |
| 6,651,077 B1 | 11/2003 | East et al. |
| 6,728,879 B1 | 4/2004 | Atkinson |
| 7,096,392 B2 | 8/2006 | Sim-Tang |
| 7,328,226 B1 | 2/2008 | Karr et al. |
| 7,343,356 B2 | 3/2008 | Prahlad et al. |
| 7,353,241 B2 | 4/2008 | Rlingsson |
| 7,373,364 B1* | 5/2008 | Chapman ............ G06F 11/1451 |
| 7,386,586 B1 | 6/2008 | Headley et al. |
| 7,509,358 B1 | 3/2009 | Bingham et al. |
| 7,546,428 B1 | 6/2009 | McAndrews et al. |
| 7,565,661 B2 | 7/2009 | Sim-Tang |
| 7,606,481 B2 | 10/2009 | Kuruma |
| 7,606,841 B1 | 10/2009 | Ranade |
| 7,606,844 B2 | 10/2009 | Kottomtharayil |
| 7,653,668 B1 | 1/2010 | Shelat et al. |
| 7,657,781 B1 | 2/2010 | Dixon et al. |
| 7,668,876 B1 | 2/2010 | Kulkarni |
| 7,680,843 B1 | 3/2010 | Panchbudhe et al. |
| 7,689,597 B1 | 3/2010 | Bingham et al. |
| 7,716,186 B2 | 5/2010 | Cannon et al. |
| 7,730,034 B1 | 6/2010 | Deflaux et al. |
| 7,792,802 B1 | 9/2010 | Rao |
| 7,802,001 B1 | 9/2010 | Petry et al. |
| 7,921,077 B2 | 4/2011 | Ting et al. |
| 7,949,662 B2 | 5/2011 | Farber et al. |
| 8,078,582 B2 | 12/2011 | Wang et al. |
| 8,095,745 B1 | 1/2012 | Schmidt et al. |
| 8,108,343 B2 | 1/2012 | Wang et al. |
| 8,117,164 B2 | 2/2012 | Spektor et al. |
| 8,161,255 B2 | 4/2012 | Anglin et al. |
| 8,166,263 B2 | 4/2012 | Prahlad et al. |
| 8,190,960 B1 | 5/2012 | Bahadur et al. |
| 8,200,615 B2 | 6/2012 | Halliday |
| 8,255,739 B1 | 8/2012 | Chatterjee et al. |
| 8,332,842 B2 | 12/2012 | Bauer et al. |
| 8,359,596 B2 | 1/2013 | Kobayashi et al. |
| 8,364,678 B2 | 1/2013 | Miller et al. |
| 8,386,631 B2 | 2/2013 | Nilsson et al. |
| 8,386,771 B2 | 2/2013 | Baker et al. |
| 8,463,633 B2 | 6/2013 | Jung et al. |
| 8,488,661 B2 | 7/2013 | Menon et al. |
| 8,510,270 B2 | 8/2013 | Pareek et al. |
| 8,521,695 B2 | 8/2013 | Zwilling et al. |
| 8,533,478 B2 | 9/2013 | Aguilera et al. |
| 8,543,746 B2 | 9/2013 | Roever |
| 8,548,945 B2 | 10/2013 | Dwyer et al. |
| 8,572,091 B1 | 10/2013 | Sivasubramanian et al. |
| 8,612,700 B1 | 12/2013 | Armstrong et al. |
| 8,635,187 B2 | 1/2014 | Beatty et al. |
| 8,650,155 B2 | 2/2014 | Corbin et al. |
| 8,676,752 B2 | 3/2014 | Kundu et al. |
| 8,712,970 B1 | 4/2014 | Sim-Tang |
| 8,719,362 B2 | 5/2014 | Wu et al. |
| 8,805,810 B2 | 8/2014 | Lucas |
| 8,818,954 B1 | 8/2014 | Bergant et al. |
| 8,949,187 B1* | 2/2015 | Satish ................. G06F 11/1461 707/640 |
| 9,183,200 B1 | 11/2015 | Liu et al. |
| 9,183,268 B2 | 11/2015 | Novick et al. |
| 9,235,606 B1 | 1/2016 | Mooney et al. |
| 9,552,382 B2 | 1/2017 | Barrus |
| 9,558,078 B2 | 1/2017 | Farlee et al. |
| 9,703,640 B2 | 7/2017 | Beatty et al. |
| 9,720,620 B1 | 8/2017 | Wei et al. |
| 9,720,991 B2 | 8/2017 | Kritchko et al. |
| 9,734,021 B1 | 8/2017 | Sanocki et al. |
| 10,162,715 B1 | 12/2018 | MacDonald McAlister et al. |
| 2002/0114341 A1 | 8/2002 | Sutherland et al. |
| 2002/0152299 A1 | 10/2002 | Traversat et al. |
| 2003/0220935 A1 | 11/2003 | Vivian et al. |
| 2004/0215803 A1 | 10/2004 | Traversat et al. |
| 2005/0022213 A1 | 1/2005 | Yamagami |
| 2005/0188256 A1 | 8/2005 | Stager et al. |
| 2005/0251540 A1 | 11/2005 | Sim-Tang |
| 2006/0020634 A1 | 1/2006 | Huras et al. |
| 2006/0053262 A1 | 3/2006 | Prahlad et al. |
| 2006/0100972 A1 | 5/2006 | Chianese et al. |
| 2006/0253600 A1 | 11/2006 | Hannuksela |
| 2007/0027937 A1 | 2/2007 | McGrattan et al. |
| 2007/0162516 A1 | 7/2007 | Thiel et al. |
| 2007/0185922 A1* | 8/2007 | Kapoor ............... G06F 11/1469 |
| 2007/0250835 A1 | 10/2007 | Kobayashi et al. |
| 2007/0276884 A1 | 11/2007 | Hara et al. |
| 2007/0028853 A1 | 12/2007 | Romem et al. |
| 2007/0288530 A1 | 12/2007 | Romem et al. |
| 2008/0294696 A1 | 11/2008 | Frandzel |
| 2009/0125362 A1 | 5/2009 | Reid et al. |
| 2009/0238262 A1 | 9/2009 | Miceli |
| 2009/0271605 A1* | 10/2009 | Park .................... G06F 11/1415 713/2 |
| 2010/0005259 A1 | 1/2010 | Prahlad et al. |
| 2010/0257138 A1 | 10/2010 | Wang et al. |
| 2010/0257140 A1 | 10/2010 | Davis et al. |
| 2010/0274762 A1 | 10/2010 | Murphy et al. |
| 2011/0141882 A1 | 6/2011 | Rieschl et al. |
| 2011/0178985 A1 | 7/2011 | San Martin Arribas et al. |
| 2011/0258239 A1 | 10/2011 | Petrocelli |
| 2012/0166401 A1 | 6/2012 | Li et al. |
| 2012/0209817 A1 | 8/2012 | Golab et al. |
| 2012/0250682 A1 | 10/2012 | Vincent et al. |
| 2012/0265890 A1 | 10/2012 | Carlson et al. |
| 2012/0303999 A1 | 11/2012 | Calder et al. |
| 2012/0317274 A1 | 12/2012 | Richter et al. |
| 2012/0317583 A1 | 12/2012 | Corbea et al. |
| 2013/0018853 A1 | 1/2013 | Jayaraman et al. |
| 2013/0073724 A1 | 3/2013 | Parashar et al. |
| 2013/0124466 A1 | 5/2013 | Naidu et al. |
| 2013/0124483 A1 | 5/2013 | Furuhashi et al. |
| 2013/0132604 A1 | 5/2013 | Cohen et al. |
| 2013/0151683 A1 | 6/2013 | Jain et al. |
| 2013/0152047 A1 | 6/2013 | Moorthi et al. |
| 2013/0166556 A1 | 6/2013 | Baeumges et al. |
| 2013/0262389 A1 | 10/2013 | Rathof et al. |
| 2013/0290642 A1 | 10/2013 | Huang et al. |
| 2013/0346366 A1 | 12/2013 | Ananthanarayanan et al. |
| 2014/0019413 A1 | 1/2014 | Braam et al. |
| 2014/0019421 A1 | 1/2014 | Jagadeesan |
| 2014/0046906 A1 | 2/2014 | Patiejunas et al. |
| 2014/0047263 A1 | 2/2014 | Coatney et al. |
| 2014/0181042 A1 | 6/2014 | Toyama et al. |
| 2014/0279905 A1 | 9/2014 | Muniswamy-Reddy et al. |
| 2014/0358844 A1 | 12/2014 | Mundlapudi et al. |
| 2015/0172412 A1 | 6/2015 | Escriva et al. |
| 2016/0077744 A1 | 3/2016 | Pundir et al. |
| 2016/0077923 A1 | 3/2016 | Zhang et al. |

(56) References Cited

U.S. PATENT DOCUMENTS

OTHER PUBLICATIONS

Randall Hunt, "Keeping Time with Amazon Time Sync Service", AWS News Blog, Retrieved the URL: https://aws.amazon.com/blogs/aws/keeping-time-with-amazon-time-sync-service on Feb. 28, 2018, pp. 1-3.
Barbara Liskov, "Practical Uses of Synchronized Clocks in Distributed Systems", ACM, copyright 1991 ACM, pp. 1-9.
James C. Corbrett, et al., "Spanner: Google's Globally-Distributed Database", Published in the Proceeding of OSDI 2012, 2012, pp. 1-14.
Friedemann Mattern, "Virtual Time and Global States of Distributed Systems", in the Proceedings of the International Workshop on Parallel and Distributed Algorithms, Oct. 1988, pp. 120-134.
U.S. Appl. No. 15/918,920, filed Mar. 12, 2018, Tate Andrew Certain, et al.
"Capturing Table Activity with DynamoDB Streams", dated Oct. 19, 2018, pp. 1-8.
Randall Hunt "New—Amazon DynamoDB Continuous Backups and Points-in-Time Recpvery", Mar. 26, 2018, pp. 1-9.
"Appendix E. Realese Notes", (PostgreSQL: Documentation: 10: E.144. Release 9.0.7), Oct. 19, 2018, pp. 1-4.
"PostgreSQL: THe World's Most Advanced Open Source Relational Database", (https://www.postgresql.org), dated Oct. 19, 2018, pp. 1-10.
U.S. Appl. No. 14/977,472, filed Dec. 21, 2015, Akshat Vig.
U.S. Appl. No. 15/728,271, filed Oct. 9, 2017, Pradeep Jnana Madhavarapu.
U.S. Appl. No. 16/231,109, filed Dec. 21, 2018, Grant Alexander MacDonald.
U.S. Appl. No. 14/977,453, filed Dec. 21, 2015, Yan Valerie Leshinsky.
U.S. Appl. No. 15/807,367, filed Nov. 8, 2017, Vaibhav Jain.
U.S. Appl. No. 15/920,207, filed Mar. 13, 2018, Akshat Vig.
U.S. Appl. No. 16/101,153, filed Aug. 10, 2018, Akshat Vig.
U.S. Appl. No. 15/920,193, filed Mar. 13, 2018, Akshat Vig.
U.S. Appl. No. 16/197,033, filed Nov. 20, 2018, Rachit Jain.
U.S. Appl. No. 16/231,109, filed Dec. 21, 2018, Grant Alexander MacDonald McAlister.
Amazon Web Services, "Amazon DynamoDB Developer Guide", API Version, Aug. 10, 2012, pp. 1-793.
Amazon Web Services, "Amazon DynamoDB Streams API Reference", API Version, Aug. 10, 2012, pp. 1-29.
U.S. Appl. No. 14/077,173, filed Nov. 11, 2013, Marvin Michael Theimer et al.
U.S. Appl. No. 14/077,171, filed Nov. 11, 2013, Marvin Michael Theimer et al.
U.S. Appl. No. 14/136,624, filed Dec. 20, 2013, Marvin Michael Theimer et al.
U.S. Appl. No. 14/136,645, filed Dec. 20, 2013, Marvin Michael Theimer et al.
U.S. Appl. No. 14/077,167, filed Nov. 11, 2013, Marvin Michael Theimer et al.
U.S. Appl. No. 14,077,162, filed Nov. 11, 2013, Marvin Michael Theimer et al.
U.S. Appl. No. 14/316,674, filed Jun. 26, 2014, Allan Henry Vermeulen et al.
U.S. Appl. No. 14/537,788, filed Nov. 10, 2014, Lei Ye et al.
International Search Report and Written Opinion From PCT/US2014/065057, dated Feb. 20, 2015, Amazon Technologies, Inc., pp. 1-13.
Alejandro Abdelnur, "Oozie Specification, a Hadoop Workflow System," Oct. 8, 2010, retrieved from http://rvs.github.com/oozie/release/2.2.1/WorkflowFunctionalSpec.html on Feb. 11, 2013, pp. 1-37.
Ani I Pillai and Alejandro Abdelnur, "Oozie Coordinator Specification," Oct. 8, 2010., retrieved from http://rvs.github.com/oozie/releases/2.2.1 /CoordinatorFunctionaiSpec.html on Feb. 11, 2013. pp. 1-43.
"Oozie-Design," retrieved from http://rvs.github.com/oozie/design.html on Feb. 11, 2013. pp. 1-2.
"Quartz Scheduler 2.1.x Documentation," retrieved from http://quartz-scheduler.org/files/documentation/Quartz-2.1.x-Documentation.pdfon Feb. 11, 2013. pp. 1-140.
Apache Kafka, "A High-Throughput Distributed Messaging System", pp. 1-42, Oct. 8, 2013.
Amazon Web Services, "Amazon Simple Queue Service (Amazon SQS)", pp. 1-5, Oct. 8, 2013.
Apache Software Foundation, "Hadoop Streaming", pp. 7-17, 2008.
Sigmod Record, "Parallel Data Processing with MapReduce: A Survey", Kyong-Ha Lee, et al., pp. 11-20, Dec. 2011.
Splunk Inc., "Splunk for Application Management", pp. 1-2, 2012.
GitHub, "Rationale", pp. 1-2, Oct. 8, 2011.
GitHub, "Tutorial", pp. 1-8, Oct. 8, 2013.
U.S. Appl. No. 13/764,716, filed Feb. 11 ,2013, Kathryn Marie Shin et al.
U.S. Appl. No. 13/764,711 , filed Feb. 11, 2013, Kathryn Marie Shin et al.
U.S. Appl. No. 61/738,967, filed Dec. 18, 2012, Kathryn Marie Shin et al.
U.S. Appl. No. 13/465,944, filed May 7, 2012, Jonathan 8. Corley et al.
U.S. Appl. No. 13/465,978, filed May 7, 2012, Jonathan 8. Corley et al.
U.S. Appl. No. 13/476,987, filed May 21, 2012, Jacob Gabrielson et al.
Pierre Dorion, IBM Tivoli Storage Manager backup software tips, Apr. 2009, http://searchdatabackup.techtarget.com/tip/IBMTivoli-Storage-Manager-backup-software-tips.
Lascon, TSM Hints and Tips on Restores, Nov. 10, 2012, LasCon Storage, http://www.lascon.co.uk/tsm-restores.php.
International Search Report and Written Opinion from PCT/US14/65052, dated Feb. 20, 2015, Amazon Technologies, Inc., pp. 1-11.
U.S. Appl. No. 14/753,475, filed Jun. 29, 2015, Allan Henry Vermeulen, et al.
U.S. Appl. No. 14/753,484, filed Jun. 29, 2015, John Michael Morkel, et al.
U.S. Appl. No. 14/753,495, filed Jun. 29, 2015, Timothy Daniel Cole, et al.
U.S. Appl. No. 14/753,505, filed Jun. 29, 2015, Allan Henry Vermeulen, et al.
U.S. Appl. No. 14/482,668, filed Sep. 10, 2014, Allan Henry Vermuelen.
U.S. Appl. No. 14/482,661, filed Sep. 10, 2014, Allan Henry Vermeulen.
U.S. Appl. No. 14/491,454, filed Sep. 19, 2014, Allan Henry Vermeulen.
U.S. Appl. No. 14/491,371, filed Sep. 19, 2014, Allan Henry Vermeulen.
U.S. Appl. No. 14/491,444, filed Sep. 19, 2014, Allan Henry Vermeulen.
U.S. Appl. No. 14/316,630, filed Jun. 26, 2014, Allan Henry Vermeulen.
U.S. Appl. No. 14/316,622, filed Jun. 26, 2014, Allan Henry Vermeulen.
U.S. Appl. No. 14/316,619, filed Jun. 26, 2014, Allan Henry Vermeulen.
U.S. Appl. No. 14/231,077, filed Mar. 31, 2014, Jacob A. Strauss.
U.S. Appl. No. 14/230,378, filed Mar. 31, 2011, Jacob A. Strauss.
Sergio Almeida, et al., "Chain Replication: a Causal + Consistent Datastore based on Chain Replication", Apr. 15-17, 2013, pp. 85-98.
Scott Lystig Fritchie, "Chain Replication in Theory and in Practice", Sep. 30, 2010, pp. 1-11.
Robbert Van Renesse, et al., "Chain Replication for Supporting High Throughput and Availability", 2004, pp. 91-104.
U.S. Appl. No. 15/717,614, filed Sep. 27, 2017, Vaibhav Jain.
U.S. Appl. No. 15/717,606, filed Sep. 27, 2017, Vaibhav Jain.

* cited by examiner

VISUALIZING RESTORATION OPERATION GRANULARITY FOR A DATABASE

This application is a continuation of U.S. patent application Ser. No. 14/462,305, filed Aug. 18, 2014, now U.S. Pat. No. 9,734,021, which is hereby incorporated by reference herein in its entirety.

BACKGROUND

Distribution of various components of a software stack can in some cases provide (or support) fault tolerance (e.g., through replication), higher durability, and less expensive solutions (e.g., through the use of many smaller, less-expensive components rather than fewer large, expensive components). However, databases have historically been among the components of the software stack that are least amenable to distribution. For example, it can difficult to distribute databases while still ensuring the so-called ACID properties (e.g., Atomicity, Consistency, Isolation, and Durability) that they are expected to provide.

While most existing relational databases are not distributed, some existing databases are "scaled out" (as opposed to being "scaled up" by merely employing a larger monolithic system) using one of two common models: a "shared nothing" model, and a "shared disk" model. In general, in a "shared nothing" model, received queries are decomposed into database shards (each of which includes a component of the query), these shards are sent to different compute nodes for query processing, and the results are collected and aggregated before they are returned. In general, in a "shared disk" model, every compute node in a cluster has access to the same underlying data. In systems that employ this model, great care must be taken to manage cache coherency. In both of these models, a large, monolithic database is replicated on multiple nodes (including all of the functionality of a stand-alone database instance), and "glue" logic is added to stitch them together. For example, in the "shared nothing" model, the glue logic may provide the functionality of a dispatcher that subdivides queries, sends them to multiple compute notes, and then combines the results. In a "shared disk" model, the glue logic may serve to fuse together the caches of multiple nodes (e.g., to manage coherency at the caching layer). These "shared nothing" and "shared disk" database systems can be costly to deploy, and complex to maintain, and may over-serve many database use cases.

Figure 1:
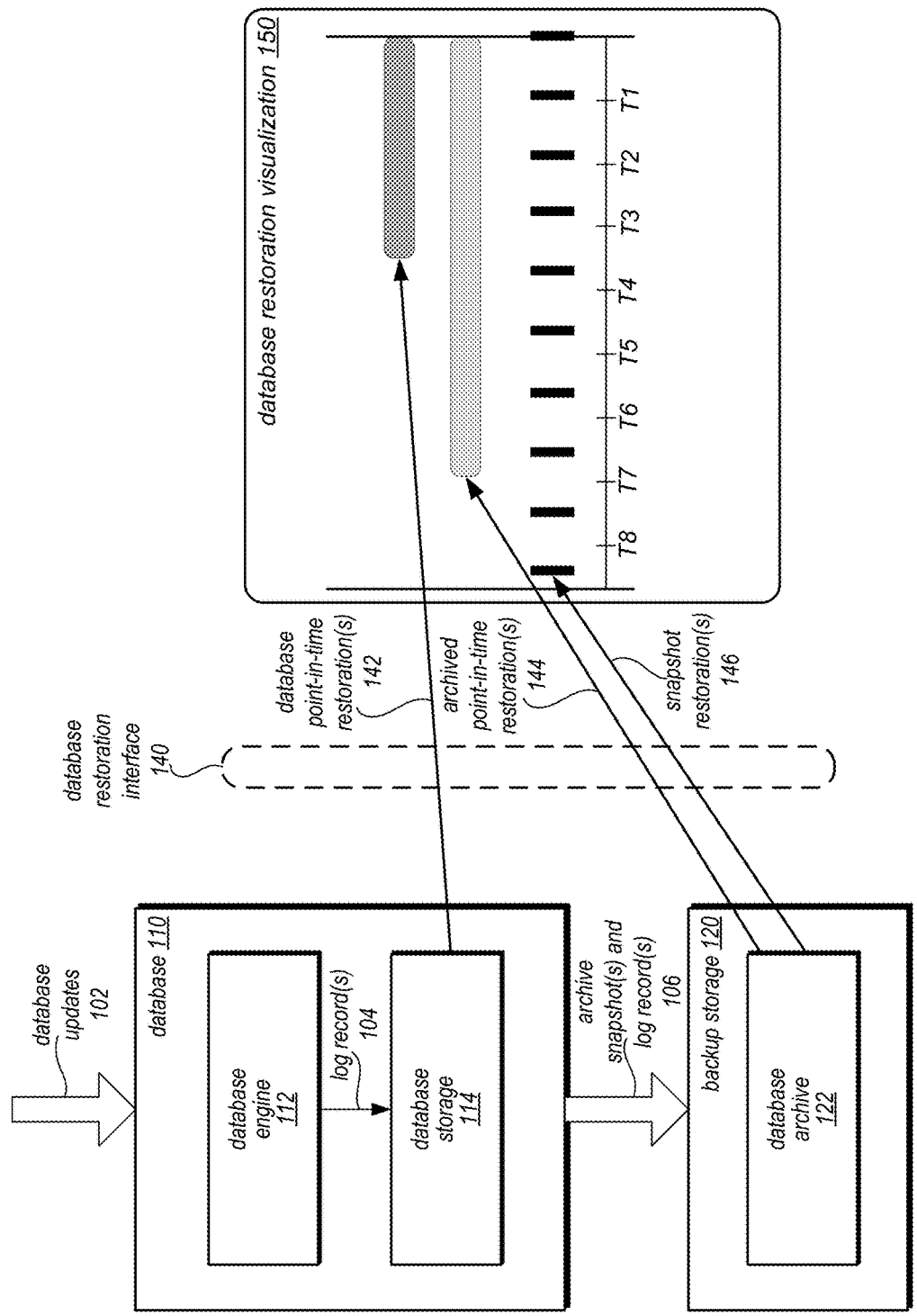
FIG. 1 is a logical block diagram illustrating visualizing restoration operation granularity for a database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

"Based On." As used herein, this term is used to describe one or more factors that affect a determination. This term does not foreclose additional factors that may affect a determination. That is, a determination may be solely based on those factors or based, at least in part, on those factors.

Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of visualizing restoration operation granularity for databases are described herein. Database restoration operations may typically be performed in order to recover from an error (e.g., accidentally dropped or deleted data) or to operate upon a data associated with a specific state for a database. A restoration operation may restore a database to a previous state, wherein the data managed by the database exists as it existed in the previous state. Selecting a restoration point for performing database restoration operations may involve understanding the relationship between possible restoration points and a desired state of the database. When many different database restoration points are available, choosing a particular one restoration point may prove daunting.

FIG. 1 is a logical block diagram illustrating visualizing restoration operation granularity for a database, according to some embodiments. Database 110 may receive database updates 102 which are processed and executed by database engine 112. In at least some embodiments, database storage 114 may be implemented to maintain a database volume for database 110. Database storage 114 may be log-structured storage, in some embodiments. Therefore, log records 104 indicating updates 102 to the database 110 may be sent to and maintained at database storage 114. Over time, various backup operations may be performed to store snapshots (which may be a complete view of the database volume) and log records (describing previously received updates to the database volume) 106 to backup storage 120. Backup storage 120 may maintain a database archive 122 storing the history of database 110.

In various scenarios, it may be desirable to restore database 110 to previous state. Database restoration interface 140 may be implemented to facilitate the selection of an appropriate restoration point for database 110. In various embodiments, a database restoration visualization 150 may be generated so that possible restoration points may be illustrated, and the best restoration point and restoration operation type may be selected and performed. Possible restoration points may be illustrated in a given period of time (e.g., T1 through T7) and ordered according to the point in time of the corresponding state of the database to which the restoration point restores the database 110. For database 110, different types of restoration operations may be performed. Restoration operation types may depend upon the underlying data used to perform the restoration operation. For example, database point-in-time restorations 142 may rely upon log records 104 maintained in database storage 114 to provide the restoration of database 110. As database storage is log-structured, updates 104 to database 110 may be non-destructive. Thus, a database point-in-time restoration 142 may restore the database to a state prior to the current state by modifying metadata for the database volume at database storage 114 to identify a particular log record corresponding to the desired state of the database as the tail of the log. Subsequent access requests may treat the identified log record as indicative of the current state of the database 110. Archived point-in-time restorations 144 and snapshot restorations may be performed based on archived snapshots and/or log records obtained from database archive 122.

Database restoration visualization 150 may be provided or implemented as part of a network-based interface for database 110. For example, a graphical user interface implemented at a network-based site (e.g., admin website for the database) may display the visualization 150. The restoration points within the visualization may be selectable for performing a corresponding restoration operation. Moreover, database restoration visualization 150 may allow a database user to view the scope and/or coverage of performing restoration operations. In some embodiments, other events and information (e.g., failure events or database performance metrics) may be overlaid in the visualization 150 so that, for example, a nearest possible restoration point prior to a failure may be selected. Visualization 150 may also help database clients determine whether a current backup and retention policy for the database provides sufficient coverage to perform a restoration in the event a restoration becomes necessary. The number of snapshots, for instance, may be increased or decreased depending on the need for providing a long term history of the database volume.

Please note, FIG. 1 is provided as a logical illustration of visualizing restoration operation granularity for a database, and is not intended to be limiting as to the physical arrangement, size, or number of components, modules, or devices, implementing a database, storage system, or composition of a restoration visualization. For example, as described below with regard to FIGS. 2-7D, the database may be implemented as part of a service that is separate from a storage service maintaining the database volume.

The specification first describes an example of a database system implemented as a database service that implements visualizing restoration operation granularity. The distributed database service may store data for many different types of clients, in various embodiments. A distributed storage service may also be described that stores data for the database service. A backup storage service may be described that stores archived versions of database data. Included in the description of the example network-based database service are various aspects of the example network-based database service along with the various interactions between the database service, the distributed storage service, and the backup storage service. The specification then describes a flowchart of various embodiments of methods for visualizing restoration operations for a database. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations, such as performing a restoration operation.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum. Similarly, for a read request directed to a particular segment, the client-side driver may route the read request to all of the nodes on which the segment is stored (e.g., asynchronously and in parallel, at substantially the same time). As soon as the client-side driver receives the requested data from a read quorum of the storage nodes in the protection group, it may return the requested data to the database tier (e.g., to the database engine head node).

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. For example, in some embodiments, in response to a request to make a change to a database, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. In such embodiments, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes.

Figure 2:
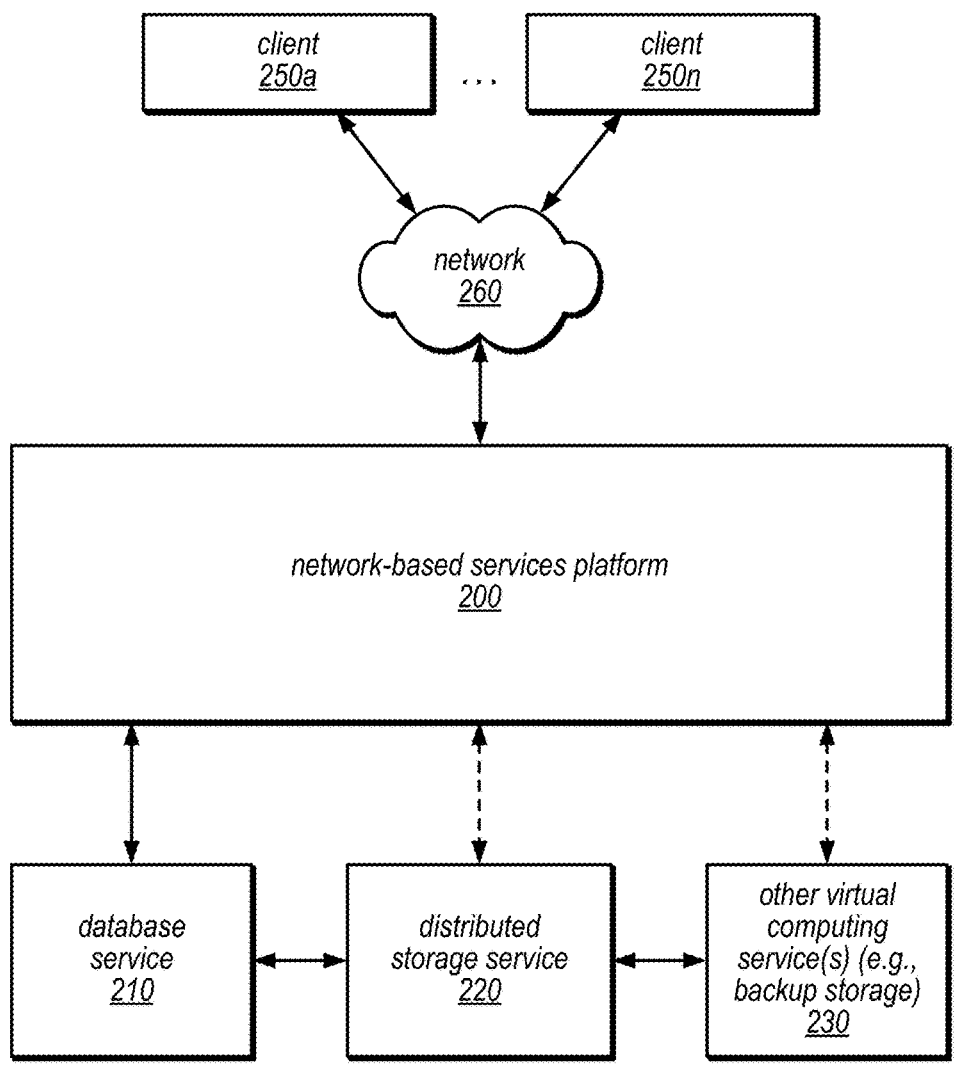
FIG. 2 is a block diagram illustrating a service system architecture that may be configured to implement a network-based database service and a network-based distributed storage service, according to some embodiments.

One embodiment of a service system architecture that may be configured to implement a network-based services-based database service is illustrated in FIG. 2. In the illustrated embodiment, a number of clients (shown as clients 250a-250n) may be configured to interact with a network-based services platform 200 via a network 260. Network-based services platform 200 may be configured to interface with one or more instances of a database service 210, a distributed storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, different nodes or system components may be distributed across multiple different data centers. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to perform a restore operation, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of a storage system service model. Instead, the details of interfacing to network-based services platform 200 may be coordinated by client 250 and the operating system or file system on behalf of applications executing within the operating system environment.

Clients 250 may convey network-based services requests (e.g., a snapshot request, parameters of a snapshot request, read request, restore operation, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230, such as a backup storage service, for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250 or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.) or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. This is illustrated in FIG. 2 by the dashed line between network-based services platform 200 and distributed storage service 220. In such embodiments, clients of the distributed storage service 220 may access distributed storage service 220 via network 260 (e.g., over the Internet).

In various embodiments distributed storage service 220 may be configured to interface with backup data store, system, service, or device as part of other virtual computing service(s) 230. Various data, such as snapshots, log records, and/or any other data maintained by distributed storage service internal clients, such as database service 210, and/or external clients such as clients 250a through 250n, may be sent to a backup data store. Restoration operations, obtaining data from the backup storage may also be performed, such as providing archived redo log records and snapshots to distributed storage service 220. This is illustrated in FIG. 2 by the solid line between other virtual computing service(s) 230 and distributed storage service 220. In some cases, the accounting and/or credentialing services of platform 200 may be unnecessary for internal clients such as administrative clients or between service components within the same enterprise.

Note that in various embodiments, different storage policies (or data retention policies) may be implemented by database service 210 and/or distributed storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
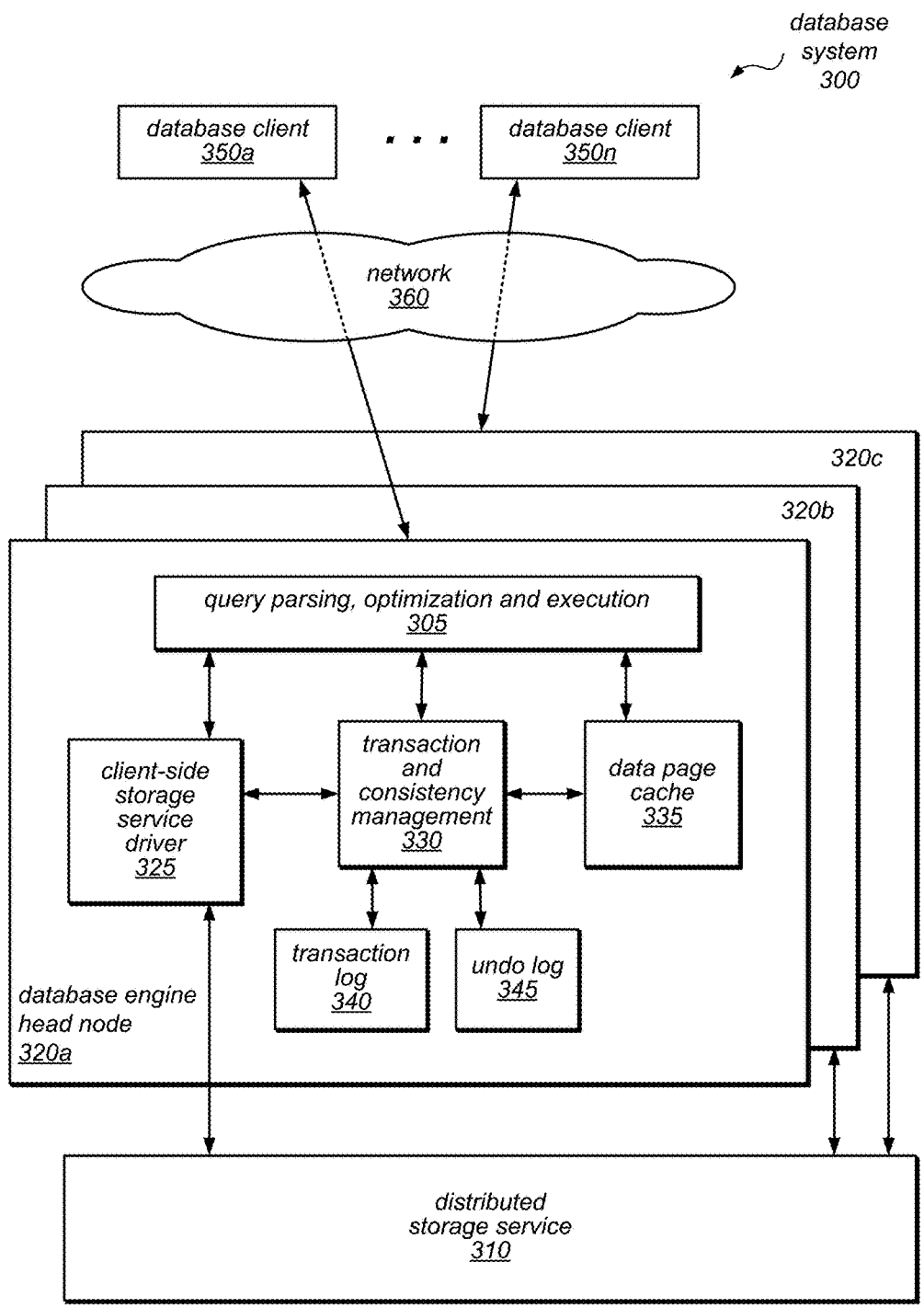
FIG. 3 is a block diagram illustrating various components of a database system that includes a database engine and a separate distributed storage service, according to some embodiments.

FIG. 3 is a block diagram illustrating various components of a database system that includes a database engine and a separate distributed database storage service, according to one embodiment. In this example, database system 300 includes a respective database engine head node 320 for each of several databases and a distributed storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, distributed storage service 310, which may be employed by the database system to store data pages of one or more databases (and redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350a).

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the distributed storage systems described herein may organize data in various logical volumes, segments, and pages for storage on one or more storage nodes. For example, in some embodiments, each database is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) (e.g., a log of redo log records) for each data page that it stores. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage service, according to various embodiments.

Volume: A volume (sometimes referred to as a database volume) is a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)). Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group (sometimes referred to as a quorum set). In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
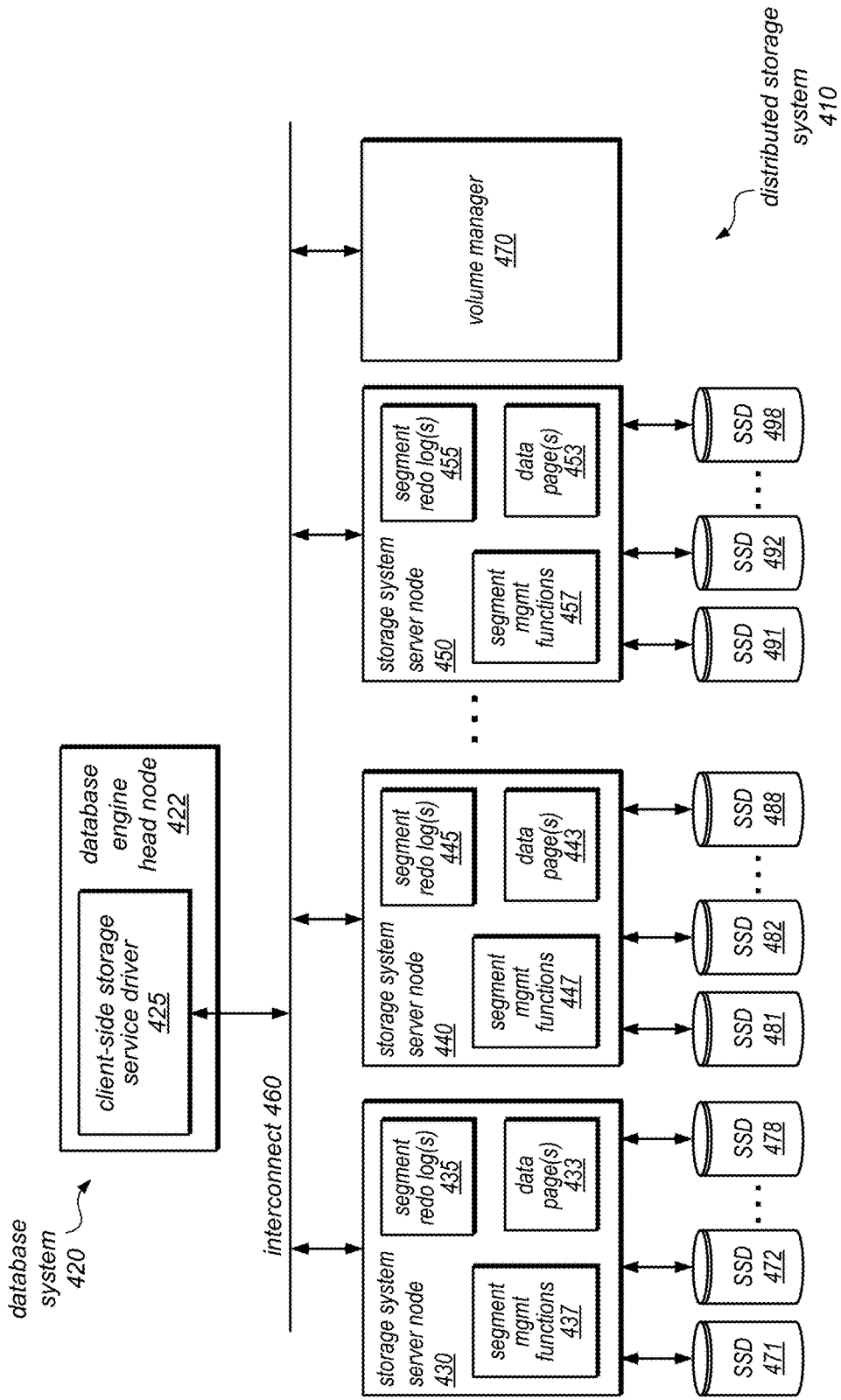
FIG. 4 is a block diagram illustrating a distributed storage system, according to some embodiments.

One embodiment of a distributed storage system is illustrated by the block diagram in FIG. 4. Although discussed in the context of the interacting with database system 420, distributed storage system 410 may more broadly illustrate the various components of a distributed storage system implementing log-structured storage. Thus storage system server nodes 430, 440, through 450 may each implement variable data replication for log-structured storage. In some embodiments, storage nodes 430-450 may perform reclamation at the same or near the same time (i.e., synchronously), or independently (asynchronously) from one another. A centralized authority, such as volume manager 470 (which may be another node or instance implemented for the distribute storage system 410, such as on one or more computing devices, such as computer system 1000 described below with regard to FIG. 10) or other module, may determine a log reclamation point (which may indicate which log records may be durably-backed in backup storage service 460) for the storage nodes 430-450 according to the various methods and techniques discussed below with regard to FIG. 10, and broadcast the log reclamation point to the storage nodes upon a change, increment or other modification of the log reclamation point, in various embodiments. For example, volume manager 470 may direct, detect, and/or determine the archival of log records and/or snapshots maintained by distributed storage system 410 to a backup storage service (e.g., a remote key-value durable backup storage system), and determine a log reclamation point such that data blocks containing log records that are currently archived may be reclaimed. Volume manager 470 may then send a Garbage Collection LSN (GCL) to indicate the log reclamation point to storage nodes 430-450. Volume manager may also implement various other techniques, such as those described below with regard to FIG. 6 maintain information describing restoration points for performing restoration operations to restore the database volume to a specific state. In some embodiments, storage nodes 430-450 may also determine the log reclamation point, such as by requesting the log reclamation point from volume manager, or querying other storage nodes to reach a consensus on log records that may be garbage collected.

In at least some embodiments, storage nodes 430-450 may store data for different clients as part of a multi-tenant storage service. For example various segments of data maintained on a storage node may correspond to different protection groups and volumes for different clients. As noted above, some storage nodes may perform reclamation independent from other storage nodes, and upon portions of a log maintained for a particular client. Consider the scenario where a storage node maintains data for two different clients. One client's data may be actively accessed/modified, causing the log structure for that data to grow quickly. Log records for the one client's data that become durably-backed in a backup data store may be reclaimed at a different time than log records maintained for the other client. In some embodiments, a storage node may be maintaining a complete view of the data for one particular client, while maintaining an incomplete view of the data for a different client.

In some embodiments, a database system 420 may be a client of distributed storage system 410, which communicates with a database engine head node 422 over interconnect 460. As in the example illustrated in FIG. 3, database engine head node 422 may include a client-side storage service driver 425. In this example, distributed storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., reclamation of space). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block-based storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

In some embodiments, each of the storage system server nodes in the distributed storage system may implement a set of processes running on the node server's operating system that manage communication with the database engine head node 422, e.g., to receive redo logs, send back data pages, and backup storage service 400, to backup or retrieve log records from an archived version of a log.

Figure 5:
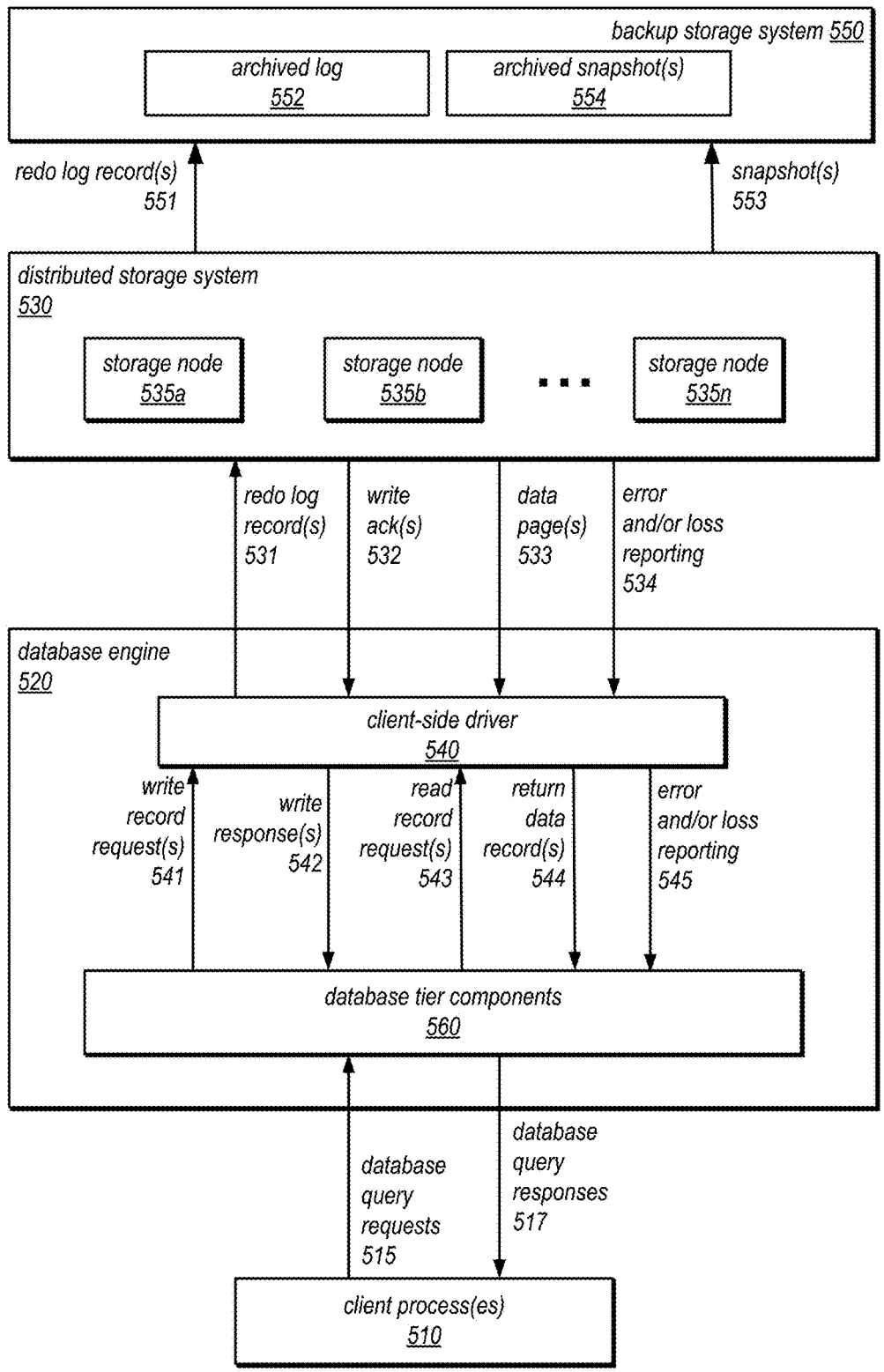
FIG. 5 is a block diagram illustrating the use of a separate distributed storage system and data backup system for data stored for a database system, according to some embodiments.

FIG. 5 is a block diagram illustrating the use of a separate distributed storage system in a database system along with a separate backup storage system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of distributed storage system 530. Distributed storage system 530 may return a corresponding write acknowledgement 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). In at least some embodiments, the requested data pages may be serviced from a data page entry in a backstop data structure maintained at a storage node 535 that maintains the data. Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, redo log records 551 may be sent to backup storage system 550 to be maintained as part of archived log 552. Similarly, snapshots 553 of a database volume may be sent to backup storage system 550 to be maintained along with other archived snapshot(s) 554.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes 535a-535n, each of which may have multiple attached SSDs. In some embodiments, distributed storage system 530 may provide high durability for stored data block through the application of various types of redundancy schemes.

As noted above, in some embodiments, the functional components of a database system may be partitioned between those that are performed by the database engine and those that are performed in a separate, distributed, storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

Figure 6:
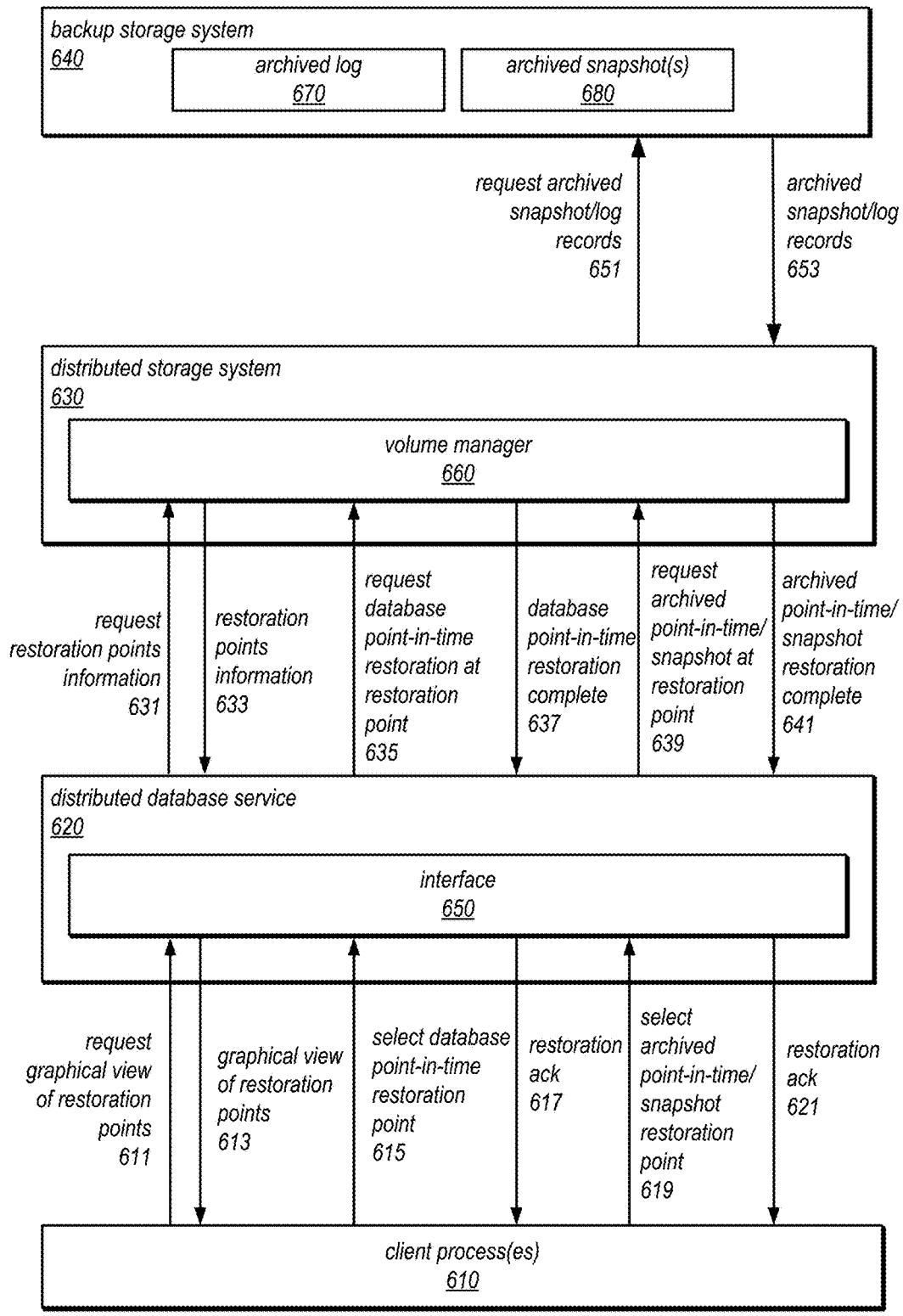
FIG. 6 is a block diagram illustrating a database system providing graphical views of restoration points for a database and performing restoration operations at the restoration points, according to some embodiments.

FIG. 6 is a block diagram illustrating a database system providing graphical views of restoration points for a database and performing restoration operations at the restoration points, according to some embodiments. In some embodiments, client process(es) 610 may request 611 a graphical view of restoration points for a database from interface 650. Distributed database service 620 may request information 631 for restoration points to be displayed within a given time period from volume manager 660. The restoration points information may be provided 633 from volume manager 660 to distributed database service 620. Distributed database service 620 may then generate a graphical representation of the restoration points (according to the various techniques discussed below with regard to FIGS. 8 and 9) and provide via interface 650 the graphical view of restoration points 613 back to client processes 610.

As the graphical representation of the restoration points may be selectable, different requests to select different restoration points may be sent. A selection of a database point-in-time restoration point 615 may be sent to interface 650 at distributed database service 620. Distributed database service may send a request 635 to volume manager 660 to perform the database point-in-time restoration at the selected restoration point. Volume manager 660 may perform the necessary metadata modifications, as discussed below with regard to FIG. 8, and acknowledge the database point-in-time restoration as complete 647 to database service 620. Database service 620 may provide a restoration acknowledgement 617 via interface 650 to client process(es) 610. For an archived point-in-time restoration or archived snapshot restoration, a request selecting the restoration point may be sent 619 to database service 620 via interface 650 from client process(es) 610. Database service 620 may send a request for the archived point-in-time or snapshot restoration point 639 to volume manager 660. Distributed storage system 630 may then request the appropriate archived snapshot and/or log records 651 from backup storage system 640 maintaining archived log 670 and archived snapshot(s) 680. The requested archived snapshot and/or log records may be provided 653 to distributed storage system 630. Volume manager 660 may then direct the generation of the restored state of the database using the archived snapshot and/or log records. For example, in some embodiments storage nodes may be provisioned to store the generated restored state of the database (which may be different from storage nodes that were/are maintaining a database volume for the database). The restored state of the database may be used as a copy or replica of the database at a different time for a different purpose than the original database volume on which it was based. In some embodiments, the restored version of the database volume may be a restoration from a storage failure or other data loss on different storage nodes maintaining the original database volume. Once complete, volume manager 660 may acknowledge the completion of the restoration as complete 641 to database service 620. Database service 620 may provide a restoration acknowledgment 621 via interface 650 to client process(es) 610.

Note that in various embodiments, the API calls and responses illustrated in FIGS. 5 and 6, may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with database engine, distributed storage system and/or backup storage system.

Figure 7A:
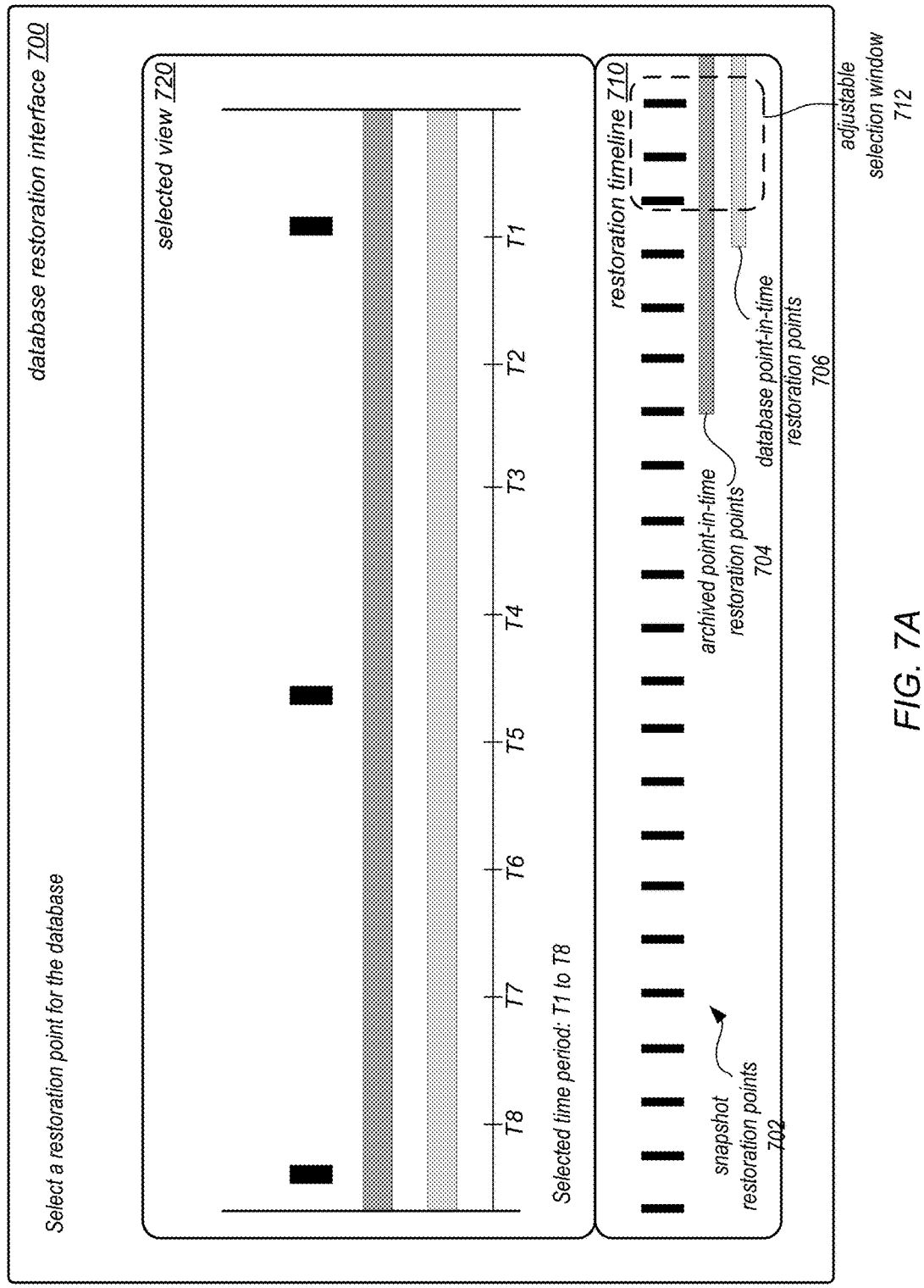
FIGS. 7A-7D are example illustrations of a database restoration interface providing a graphical representation of restoration points ordered according to respective points in time, according to some embodiments

FIGS. 7A-7D are example illustrations of a database restoration interface providing a graphical representation of restoration points ordered according to respective points in time, according to some embodiments. As illustrated in FIG. 7A, database restoration interface may provide multiple views of possible restoration points within a given time period and may be implemented in various types of interfaces (e.g., hosted at a network-based site for administering a database). For example, selected view 720 may provide an enlarged or more detailed view of different possible restoration points illustrated below in restoration timeline 710. In some embodiments, selected view 720 may be one generated graphical representation (according to the techniques discussed below with regard to FIGS. 8 and 9) while restoration time line 710 may be another graphical representation of possible restoration points for a different time period. Adjustable selection window 712 may be a user interface element that allows user input (e.g., mouse click/drag, touch input, keyboard input, etc. . . . ) to modify the period of time displayed in selected view 720.

Both restoration timeline 710 and selected view 720 may illustrate possible restoration points ordered according to the particular point-in-times of the respective states of the database, as well as the different restoration operation types. In this way, the different granularity and scope of different restoration operations for the database may be easily viewed. Snapshot restoration points 702, for example, are only available at certain time intervals (which may be periodic or aperiodic), whereas the coverage of archived point-in-time restoration points 704 may allow for restorations to a more specific state of the database. The differences in cost or performance of different restoration operations may also be visualized. For instance, the faster restore operation using database point-in-time restoration points 706 is available for a much smaller period of time than archived point-in-time restoration points 704 or snapshot restoration points 702 (which may be slower restoration operations). Visualizing the different restoration operation types may allow a customer to adjust or modify the data maintained for performing different restoration operations (e.g., increasing the amount of log records maintained in database storage to perform database point-in-time restoration operations).

Figure 7B:
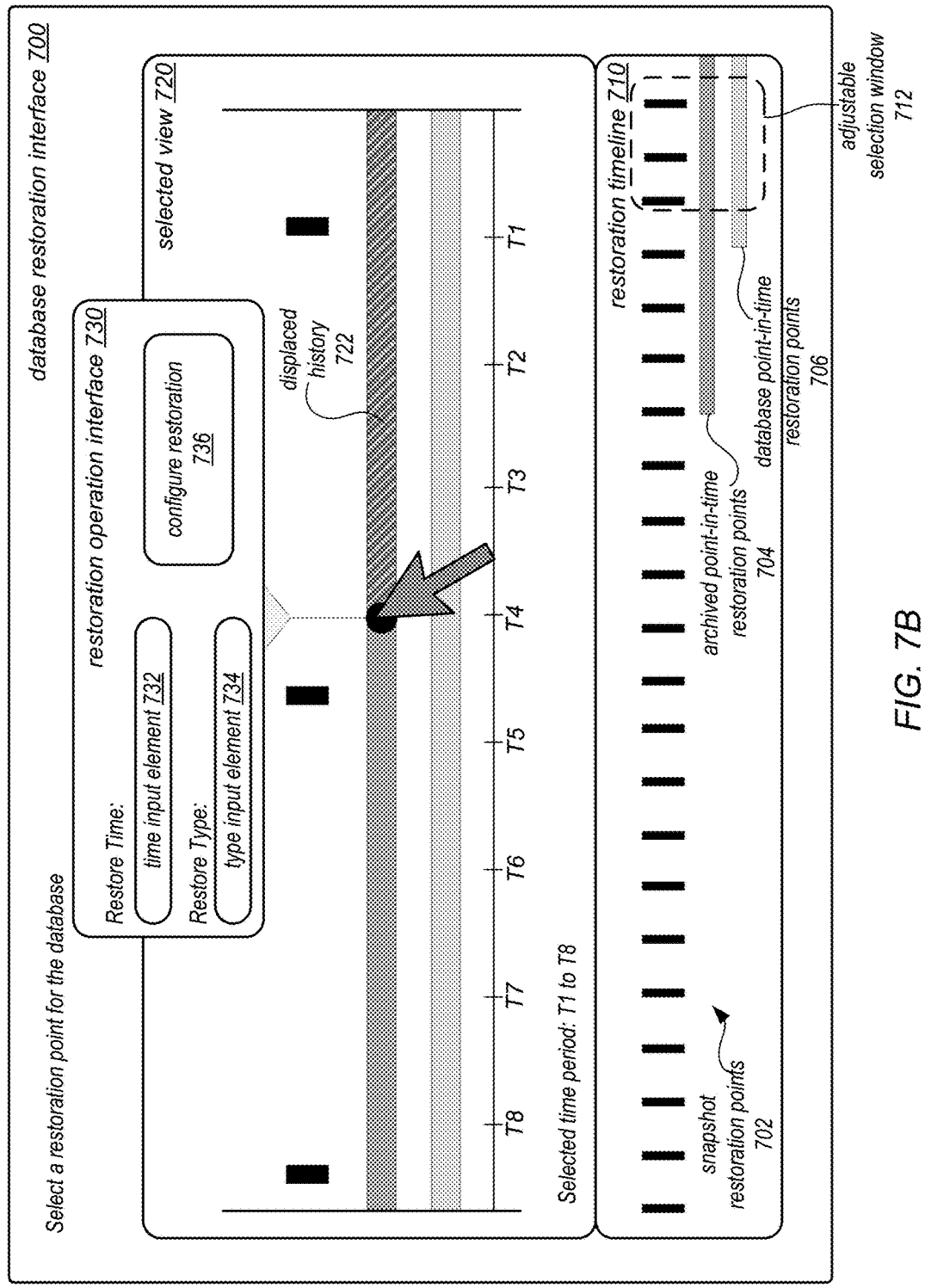

As illustrated in FIG. 7B, input (e.g., a mouse click, touch gesture, or keyboard command) may select a particular possible restoration point. In response, restoration operation interface 730 may be displayed. Restoration operation interface 730 may implement a time input element 732 to confirm the point-in-time for the restoration operation, a restoration operation type input element 734 to confirm the restoration operation type (which may be initially determined by selecting the point on the corresponding timeline). For example, the point selected is located on the archived point-in-time restoration points 704 timeline. Restoration operation interface 730 may also provide an input or further configuration elements 736 to configure the restoration operation (e.g., schedule restoration operation and/or set target location for restored database volume). In some embodiments, the effect of the restoration operation on the database volume may be identified. Displaced history 722 indicates the history of the database volume that may no longer be available if the restoration operation for the selected possible restoration point is performed.

Figure 7C:
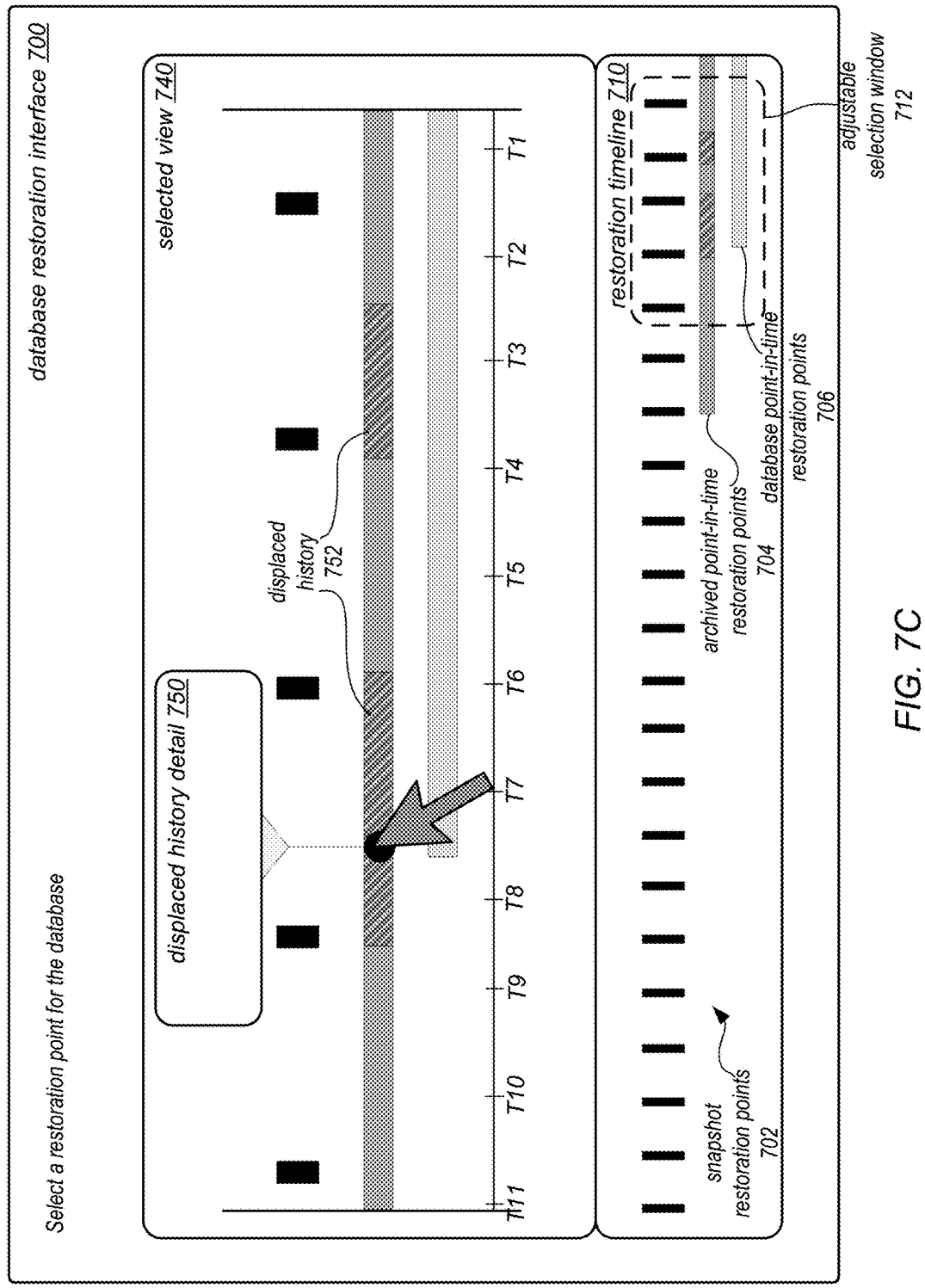

As illustrated in FIG. 7C, the adjustable selection window 712 may be changed, generating a new graphical representation for selected view 740. Additionally, as one or more restoration operations are performed on the database, the displaced history 752 may be indicated in the timeline. In some embodiments, the displaced history may be reflected in multiple timelines. Displace history details 750 may be provided in some embodiments, in response to the selection of displaced history 752 (e.g., hovering over or mouse-clicking on displaced history 752). Displaced history details 750 may describe information about the restoration operation or database volume event, when it was performed, what user account authorized the restoration, or any other information relevant to the restoration operation that created the displaced history.

Figure 7D:
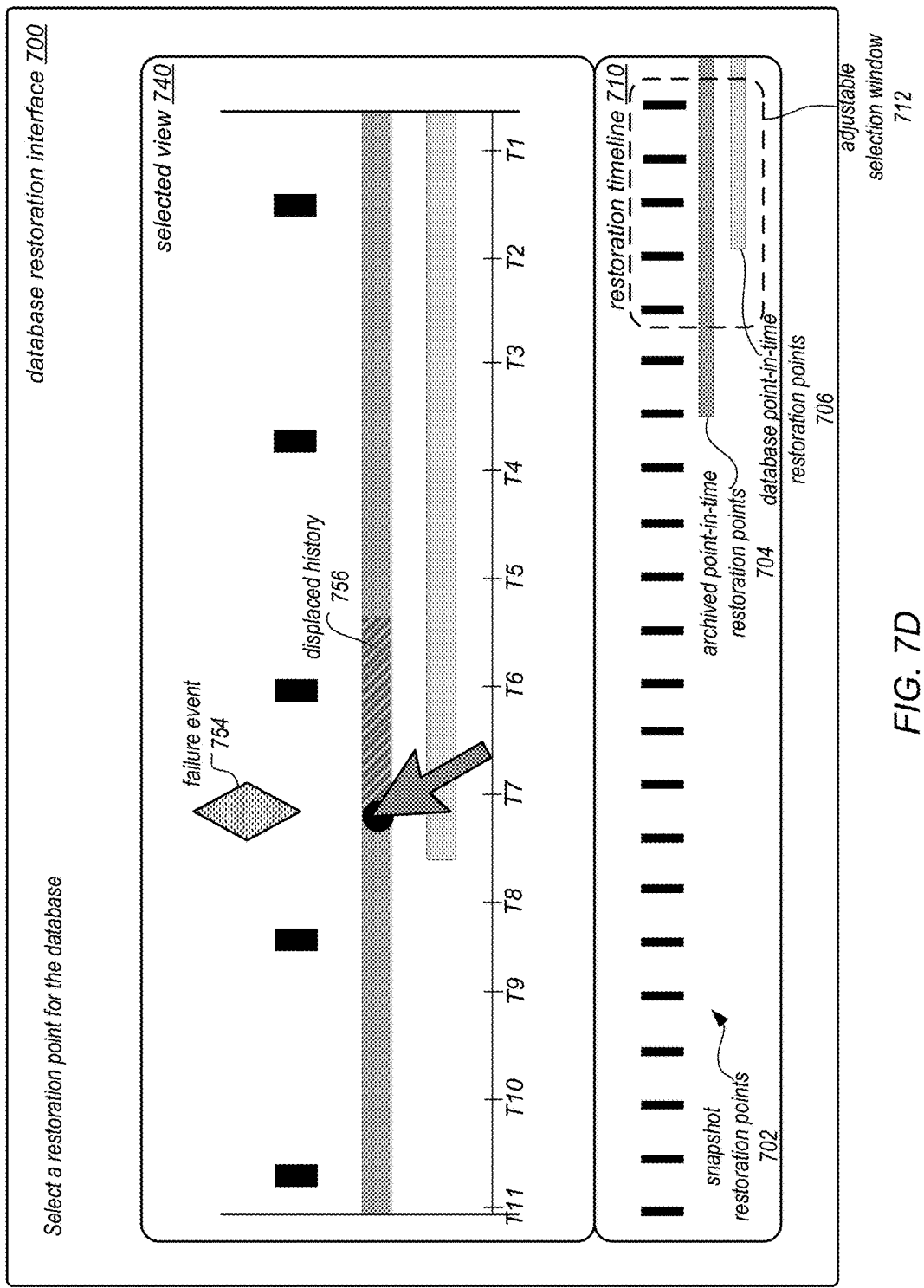

As illustrated in FIG. 7D, a failure event 754 may be included along with the restoration points in the graphical representation for selected view 740. The failure event may indicate a particular storage failure or data loss for the database, as well as displaced history 756 as a result of the data loss. By illustrating the failure event within the graphical representation, a user may be able to easily understand, located and/or identify a restoration point that provides a state of the database nearest to the failure event 754. Although not illustrated, various other metrics may also be overlaid on the selected view 740 (or 720). Performance metrics, such as network traffic or CPU utilization may be overlaid as a graph to observe whether displaced history (which may also occur as a result of database volume events which are discussed below in more detail with regard to FIG. 9) may have been caused by the recorded events.

Figure 8:
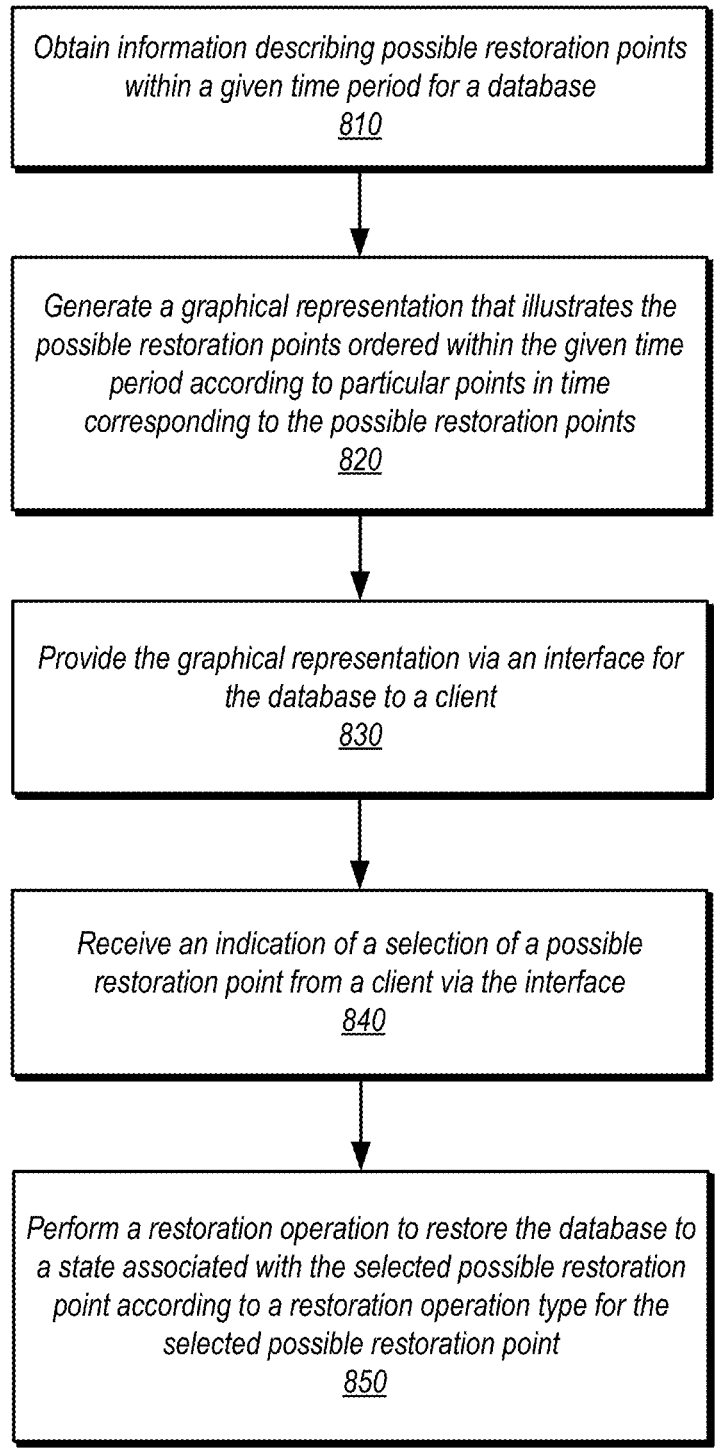
FIG. 8 is a high-level flowchart illustrating various methods and techniques for visualizing restoration operation granularity for a database, according to some embodiments.

The various embodiments of a distributed storage system described with regard to FIGS. 2-7D above, may implement one or more different techniques for visualizing restoration operation granularity for a database. Visualizing restoration operation granularity for databases is not limited to such systems, however. Various other kinds of databases may implement variable data replication for storage implementing data backup. For example, databases that do not separately store the database volume in a different system or service may provide graphical representations indicating the possible restoration points for the database volume. Alternatively, a single system or device (e.g., local redundant data store) may provide a private backing store for archiving database updates. Moreover, although the various techniques described above were described with regard to a database utilizing a log-structured storage system, these techniques may be applied more generally to other types of storage systems storing data for a database which may possible different types of restoration operations at different points in time. FIG. 8 is a high-level flowchart illustrating various methods and techniques for visualizing restoration operation granularity for a database, according to some embodiments. Different combinations of systems and/or devices may implement the various techniques discussed below.

A request, indication, or instruction to generate a graphical representation of possible restoration points may be received at or determined for a distributed database, in various embodiments. For example, an interface may be implemented (e.g., a network-based site, such as a website, or API) via which such requests or instructions may be received. A given time period for the graphical representation may be included in a request or the given time period may be determined (e.g., according to a default time period). The given time period may be adjusted or changed, as noted above with regard to FIGS. 7A-7D, and such adjustments or changes may trigger requests or instructions to generate a graphical representation. The time period may be represented as start and stop times, log sequence numbers, or any other indicators that provide boundaries sufficient to identify whether a possible restoration point is included within the given time period.

As indicated at 810, information describing possible restoration points within the given period of time for the database may be obtained. A restoration service, backup service, or storage manager (e.g., volume manager 470 described above with regard to FIG. 4) may record, track, or maintain information for possible restoration points, in some embodiments. Obtaining the information describing the possible restoration points may be performed by requesting information from a system or service. However, in some embodiments, a database system itself or component of an interface or control plane performing the techniques described below with regard to FIG. 8 may also track or maintain information describing possible restoration points. Thus, the previous examples are not intended to be limiting.

The information describing possible restoration points within the given time period may indicate respective states of the database corresponding to particular points in time within the given time period. For example, a possible restoration point within a time period of T1 through T7 may be described as corresponding to a state of the database at T2. In some embodiments, the particular time and/or state of the distributed database may be described by receiving a time stamp or log sequence number (LSN) associated with the possible restoration point. In some embodiments, respective restoration operation types may be provided for the possible restoration points within the given time period. For example, designation codes or locations of the snapshots or log records may indicate the operation type for a possible restoration point. For example, the information may describe that a storage system maintaining a database volume for the database includes possible restoration points at times T1, T2, and T3 (indicating that a database point-in-time restore operation may be performed for possible restoration points at T1, T2, and T3), that a backup storage system maintains possible restoration points at times T1, T2, T3, T4, T5, and T6 (indicating that an archived point-in-time restore may be performed for possible restoration points at T1, T2, T3, T4, T5, and T6), and that the backup storage maintains archived snapshots at times T1, T10, and T20 (indicating that archived snapshot restoration operations may be performed for possible restoration points at T1, T10, and T20).

Additional information may also be obtained, in some embodiments, describing performance metrics, failure statistics or events, failovers, system maintenance, or any other information which may be included in the graphical representation in addition to the possible restoration points. The additional information may be obtained from the same or different sources as the possible restoration points. For example, a control plane or other system administrative component for the distributed database may track performance metrics for different components and/or operations within the database, storage, and/or backup storage systems. The control plane may then provide this information to be included when generating the graphical representation, in some embodiments.

As indicated at 820, a graphical representation that illustrates the possible restoration points ordered within the given time period according to the particular points in time for the respective states of the distributed database corresponding to the possible restoration points may be generated, in various embodiments. For example, in some embodiments, the possible restoration points may be plotted over time as line or plot graph. As illustrated in FIGS. 1 and 7A-7D, the possible restoration points may be illustrated as respective timelines. The graphical representation may indicate the restoration operation type for the possible restoration point. As illustrated in the FIGS. 1 and 7A-7D discussed above, separate plots or lines may be illustrated for each operation type. Please note that two or more possible restoration points may correspond to a same state of the distributed database. For example, a possible restoration point for performing an archived point-in-time restore operation at T2 may provide the same database state as a possible restoration point for performing a database point-in-time restore operation at T2.

In some embodiments, other information may be included in the graphical representation generated for the given time period. For example, failure events, performance metrics, failovers, system maintenance events, triggered alarms, traffic or processing spikes, or any other information may also be plotted or overlaid within the graphical representation. A recommended possible restoration point may be indicated (e.g., by highlighting, encircling, or otherwise denoting the possible restoration point), in some embodiments. For example, a control plane, service administrator, or other system or device may determine a nearest possible restoration point prior to a system failure event, and provide the recommendation to be included when generating the graphical representation.

As indicated at 830, the graphical representation may be provided via the interface for the database to a client, in some embodiments. For example, a control or administrative panel of a network-based site may display the graphical representation as part of a graphical user interface for performing a restoration operation, in at least some embodiments. In some embodiments, the graphical representation may be provided via an API to a requesting client. Generally, the interface may be a network-based to receive input and output from a client via a network, in some embodiments. In other embodiments, the interface may be locally implemented interface receiving input and output via different communication technique than a network-based implementation.

As indicated at 840, an indication of a selection of a possible restoration point may be received via the interface. The possible restoration points in the graphical representation may be selectable or available for initiating a restoration operation via graphical user interface displaying the graphical representation. For example, as discussed above with regard to FIG. 7B, a possible restoration point may be located in the graphical representation and selected (e.g., mouse click, touch input gesture). Identifiers or times may also be used to select a possible restoration point which can be submitted via an API request (e.g., "perform database point-in-time restore operation at T3").

As indicated at 850, in response to receiving the indication of the selection, a restoration operation may be performed to restore the distributed database to the respective state associated with the selected possible restoration point according to the restoration operation type for the selected possible restoration point, in various embodiments. A restoration operation configuration graphical user interface element (e.g., a popup window, tab, or dialogue) may be provided in response to the selection to configure the restoration operation (e.g., confirm possible restoration point, operation type, schedule restoration, set target location for restored database volume, etc. . . . ). The restoration operation may be performed as configured via the graphical user interface element for restoration operation configuration, in some embodiments.

Restoration operation types may, in various embodiments, be implemented dependent upon the underlying data (e.g., archived snapshots, archived log records, or log records) used to perform the restoration. For example, an archived snapshot operation type may utilize an archived snapshot to restore the database. In some embodiments an archived snapshot may be obtained from archive storage (e.g., backup storage system 640 discussed above with regard to FIG. 6) that corresponds to the state of the database for the selected possible restoration point. The archived snapshot may then be placed on target storage nodes or other storage location hosting the database volume for the restored database. Subsequent access may then be directed to and/or served from the archived snapshot in order to provide access to the restored state of the database.

Similarly, an archive point-in-time restoration operation type may utilize archived log records (in addition to an archived snapshot). For example, in various embodiments, one or more archived log records and an archived snapshot may be obtained that together may describe the state of the database for the selected possible restoration point. A restored state of the database may be generated based on the obtained archived snapshot and one or more archived log records. For example, the archived log records may be replayed with respect to the archived snapshot, in order to generate a new state for the data volume. However, in some embodiments, the log records may be maintained along with the archived snapshot as the new database volume, wherein subsequent updates are effectively added to the tail of the log described by the archived log records. Access may be provided to the generated restored state of the database such that subsequent access requests are directed to or served from the restored state of the database.

A database point-in-time operation type may utilize metadata maintained for log records describing updates to the database volume in database storage (e.g., distributed storage system 630 discussed above with regard to FIG. 6). The metadata may point to the tail of the log (e.g., log record which indicates the most recent update to the database volume) providing the current state of the distributed database. As updates to the database volume in a log-structured data store may be non-destructive (i.e., do not overwrite previous updates), then to restore the database to a state prior to the current state, the metadata may be modified to identify a log record corresponding to the state of the database for the selected restoration point as the tail of the log. Subsequent access requests may treat the identified log record as indicative of the current state of the distributed database. New log records may be appended to the new tail of the log (excluding but not necessarily erasing those displaced log records which are no longer used to determine the state of the database volume).

Figure 9:
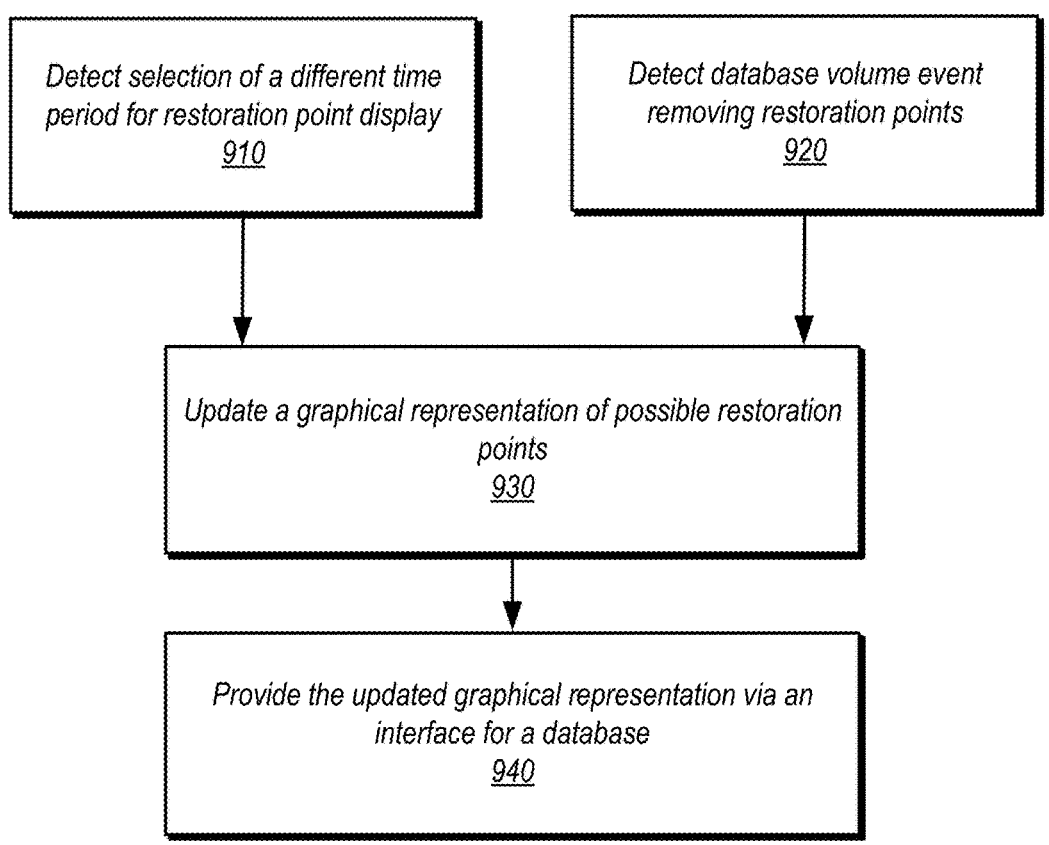
FIG. 9 is a high-level flowchart illustrating methods and techniques for updating a graphical representation of restoration points for a database, according to some embodiments.

As new updates are received, restoration operations performed, or failures and other database system events detected, the possible restoration points and other information illustrated in a graphical representation may change or become obsolete. New log records, for example, may be stored indicating updates to a database volume and providing new states of the database to which the database may be restored. The graphical representation may be updated to reflect these changes. For instance, the given time period of possible restoration points may be a rolling window displaying a period of time determined with respect to a current time (e.g., a 24 hour window). More generally, FIG. 9 is a high-level flowchart illustrating methods and techniques for updating a graphical representation of possible restoration points for a database, according to some embodiments.

As indicated at 910, a selection of a different time period for possible restoration point display may be detected, in various embodiments. For example, as illustrated in FIGS. 7A, 7C, and 7D the time period for displaying possible restoration points may be adjusted by changing a user interface element (whether a graphical user interface element) or by entering start and stop times for the new time period. The different time period may be a contraction or expansion of a current time period (adding to or removing from those possible restoration points already included within the current time period). In some embodiments, the different time period may include a different set of possible restoration points. The different time period may be defined by starting and ending LSNs, which may indicate which log records may be included within the different time period, in at least some embodiments.

As indicated at 930, in response to detecting the selection of a different time period, a graphical representation of possible restoration points may be updated, in various embodiments. For example, information describing the possible restoration points included within the different time period may be obtained. As discussed above with regard to FIG. 8, the information may describe respective states of the database corresponding to particular points in time for those possible restoration points included within the different time period. The information may also describe operation types for the restoration points in the different time period. For example, the possible restoration points may correspond to database point-in-time restore operations, archived point-in-time restore operations, or snapshot restore operations. Updating the graphical representation may be performed similar to generating the graphical representation as discussed above at element 820 in FIG. 8. Possible restoration points may be ordered according to the point-in-time of the respective state of the database corresponding to the possible restoration points. The possible restoration points may also be grouped together according restoration operation type, such as illustrating the possible restoration points for a database point-in-time restore operations in one timeline, while illustrating the possible restoration points for performing archived point-in-time restorations in another timeline. In this way, the restoration operation type for the possible restoration points may be indicated in the updated graphical representation. Once updated, the graphical representation may be provided via the network-based interface to the client, as indicated at 940.

As indicated at 920, a database volume event that removes possible restoration points such that the possible restoration points are not selectable for performing a restoration operation may be detected, in various embodiments. Database volume events may be any action or failure, whether directed or otherwise that may result in the unavailability or loss of possible restoration points. For example, in some embodiments logical corruption or other failure events (e.g., node or server failures implementing the database engine head node or storage nodes) may cause the loss of log records or metadata describing a database volume. The loss of these log records or metadata may prevent restoration operations from performing for the corresponding possible restoration point. Similarly, a failure event that causes data loss, whether in the distributed storage system maintaining the database volume or the backup storage system maintaining archived snapshots and archived log records, may prevent restoration operations from performing that rely upon the lost log records, archived snapshots, and/or archived log records. Possible restoration points that restore the distributed database to a state that relies upon lost or corrupted log records, metadata, and/or snapshots may be considered removed such that the possible restoration points are not selectable for performing a restoration operation.

In some embodiments, database volume events may be triggered by restoration operations. For example, a restoration operation may restore a distributed database to a state of the database at a point in time after which subsequent updates to the distributed database occur. The log records describing these subsequent updates may be excluded from consideration so that new updates received for the database are recorded after the excluded updates in the log for the database volume. These excluded updates may be displaced history of the database volume, such as displaced history 722, 752, and 756 in FIGS. 7B-7D. Possible restoration points that restore the distributed database to a state within displaced history (e.g., rely upon excluded log records) may be considered removed such that the possible restoration points are not selectable for performing a restoration operation.

As indicated at 930, in response to detecting the database volume event removing possible restoration points, a graphical representation of possible restoration points may be updated, in various embodiments. For example, as illustrated in FIGS. 7B-7D, restoration points may be visually designated or indicated as unavailable (e.g., the color of the timeline including the restoration points may be changed and/or selecting unavailable restoration points may not trigger any further action or result). In some embodiments, descriptive information may be included in the graphical representation (or may be included in response to hovering over, selecting, or performing some action via the network-based interface with respect to the unavailable restoration points) that describes the database volume event (e.g., type of failure event or type of restoration operation performed). Once updated, the graphical representation may be provided via the network-based interface to the client, as indicated at 940.

In at least some embodiments, the graphical representation of possible restoration points in a given period of time may be dynamically updated as changes or events are detected, providing a live or real-time view of the possible restoration points of the given time period. However, in some embodiments, a request, update, refresh or other explicit indication that the graphical representation may be received prior to updating the graphical representation. While changes to the time period and database volume events are separately illustrated, updates that occur as result of detecting either a change of time period or a database volume event may be made together. If, for example, the time period for the graphical representation is changed, any possible restoration points included in the new time period which are removed as a result of a database volume event may be illustrated as unavailable in the updated graphical representation.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 10:
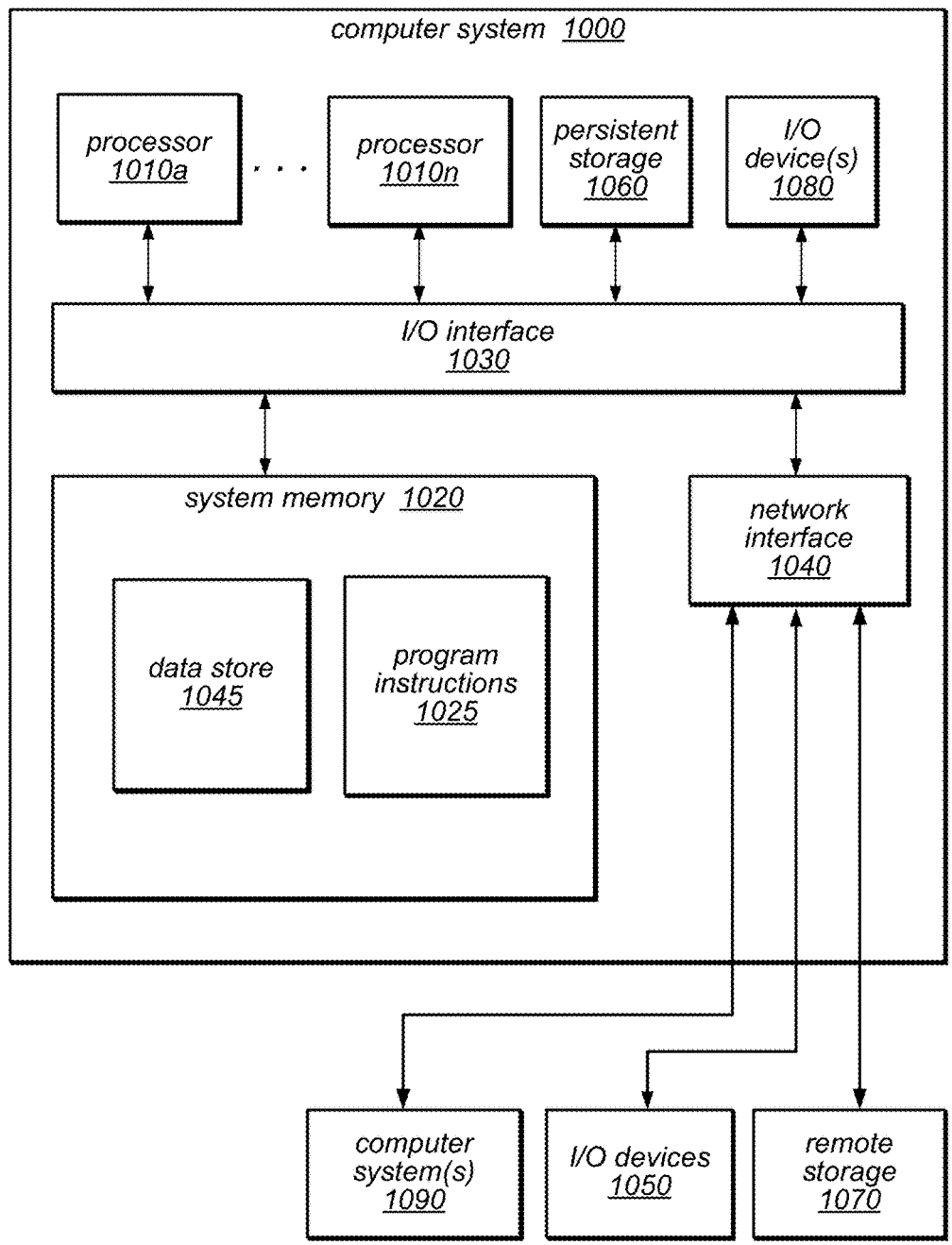
FIG. 10 is an example computer system, according to various embodiments.

FIG. 10 is a block diagram illustrating a computer system configured to implement at least a portion of the storage systems, database systems, backup storage systems, or other systems or devices described herein, according to various embodiments. For example, computer system 1000 may be configured to implement a database engine head node of a database tier, or one of a plurality of storage nodes of a separate distributed storage system that stores databases and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database or storage systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) or backup storage system may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   one or more processors and memory storing instructions executable by the one or more processors to:
   receive information indicating a plurality of possible restoration states of a database that is stored at a network-accessible database service accessible to a plurality of clients over a network;
   provide, over the network to a given client of the plurality of clients, a user interface for selecting one of the possible restoration states of the database, the user interface including a time-based graphical representation of the information including indications of corresponding times associated with respective ones of the possible restoration states of the database and one or more user interface elements for selecting one of the possible restoration states of the database for restoration at the network-accessible database service;
   receive over the network via the user interface, an indication of a selected one of the possible restoration states; and
   cause the database stored at the network-accessible database service to be restored to the selected one of the possible restoration states in response to the indication received over the network via the user interface.

2. The system of claim 1, further comprising a plurality of storage nodes that together implement a log-structured data store, wherein data for the distributed database is stored in a database volume maintained in the log-structured data store, and wherein a plurality of log records are maintained as part of the log-structured data store that indicate respective updates to the database volume.

3. The system of claim 2,
   wherein a restoration operation for the selected one of the possible restoration states is a database point-in-time restoration; and
   wherein to perform the restoration operation, the database system is configured to modify metadata for the database volume to identify a log record of the plurality of log records that corresponds to the selected one of the possible restoration states such that a subsequent access request directed to the distributed database accesses the database volume at the selected one of the possible restoration states corresponding to the identified log record.

4. The system of claim 2, wherein the distributed database is a network-based service implemented as part of a network-based services platform, and wherein the log-structured data store is a multi-tenant, distributed storage service implemented as part of the network-based services platform.

5. The system of claim 1,
   wherein a backup data store maintains a plurality of archived snapshots of the database volume and a plurality of archived log records indicating updates with respect to the database volume;
   wherein a respective restoration operation for the selected one of the one or more possible restoration states is an archived point-in-time restoration; and
   wherein to perform the restoration operation, the system is configured to:
   obtain from the backup data store an archived snapshot of the plurality of archived snapshots and one or more archived log records of the plurality of archived log records that together describe the selected one of the possible restoration states associated with the indication; and
   based, at least in part, on the obtained archived snapshot and the one or more archived log records, generate a restored state for the database volume such that a subsequent access request directed to the database accesses the database volume at the selected one of the possible restoration states.

6. The system of claim 1, wherein the system is further configured to:
   detect a database volume event removing one or more of the possible restoration states;

update the graphical representation for the plurality of possible restoration states to indicate that the removed one or more possible restoration states are unavailable for selection; and provide the updated graphical representation to a user.

7. The system of claim 1, wherein the graphical representation further illustrates one or more database system performance metrics for a given time period corresponding to the plurality of possible restoration states.

8. A method, comprising:
performing, by one or more computing devices:
receiving information indicating one or more possible restoration states of a database that is stored at a network-accessible database service accessible to a plurality of clients over a network;
providing, over the network to a given client of the plurality of clients, a user interface for selecting one of the possible restoration states of the database, the user interface including time-based graphical representation of the information including indications of corresponding times for respective ones of the possible restoration states of the database and one or more user interface elements for selecting one of the possible restoration states of the database for restoration at the network-accessible database service;
receiving over the network via the user interface, an indication of a selected one of the possible restoration states; and
causing the database stored at the network-accessible database service to be restored to the selected one of the possible restoration states in response to the indication received over the network via the user interface.

9. The method of claim 8, wherein causing the database stored at the network-accessible database service to be restored to the selected one of the possible restoration states comprising:
in response to receiving the indication of the selection of the selected one of the possible restoration states, performing a restoration operation to restore the database to the respective state of the database at a particular point in time that corresponds to the selected possible restoration state, wherein the restoration operation is performed according to a respective operation type for the selected possible restoration state.

10. The method of claim 9, wherein data for the database is stored in a database volume maintained in a log-structured data store, and wherein a plurality of log records are maintained as part of the log-structured data store, wherein the log records indicate respective updates to the database volume.

11. The method of claim 10,
wherein the respective restoration operation type for the selected one of the possible restoration states is a database point-in-time restoration; and
wherein performing the restoration operation comprises modifying metadata for the database volume to identify a log record of the plurality of log records that corresponds to the respective state of the database for the selected one of the possible restoration states such that a subsequent access request directed to the database accesses the database volume at the selected possible restoration state corresponding to the identified log record.

12. The method of claim 9,
wherein a backup data store maintains a plurality of archived snapshots of the database volume and a plurality of archived log records indicating updates with respect to the database volume;
wherein a respective restoration operation type for the selected possible restoration state is an archived point-in-time restoration; and
wherein performing the restoration operation comprises:
obtaining from the backup data store an archived snapshot of the plurality of archived snapshots and one or more archived log records of the plurality of archived log records that together describe the selected possible restoration state; and
based, at least in part, on the obtained archived snapshot and the one or more archived log records, generating a restored state for the database volume such that a subsequent access request directed to the database accesses the database volume at the selected possible restoration state.

13. The method of claim 8, further comprising:
detecting a database volume event removing one or more of the plurality of possible restoration states;
updating the graphical representation for the plurality of possible restoration states to indicate that the removed one or more possible restoration states are unavailable for selection; and
providing the updated graphical representation via an interface, to a user.

14. A non-transitory, computer-readable storage medium, storing program instructions that when executed by one or more computing devices cause the one or more computing devices to implement:
receiving information indicating a plurality of possible restoration states of a database that is stored at a network-accessible database service accessible to a plurality of clients over a network;
providing, over the network to a given client of the plurality of clients, a user interface for selecting one of the possible restoration states of the database, the user interface including a time-based graphical representation of the information including indications of corresponding times for respective ones of the possible restoration states of the database and one or more user interface elements for selecting one of the possible restoration states of the database for restoration at the network-accessible database service;
receive over the network via the user interface, an indication of a selected one of the possible restoration states; and
causing the database stored at the network-accessible database service to be restored to the selected one of the possible restoration states in response to the indication received over the network via the user interface.

15. The non-transitory, computer-readable storage medium of claim 14,
wherein data for the database is stored in a database volume maintained in a log-structured data store, and wherein a plurality of log records are maintained as part of the log-structured data store that indicate respective updates to the database volume;
wherein a respective restoration operation type for the at least one possible restoration state associated with the indication is a database point-in-time restoration; and
wherein, in performing the restoration operation, the program instructions cause the one or more computing devices to implement modifying metadata for the database volume to identify a log record of the plurality of log records that corresponds to the selected possible restoration state such that a subsequent access request directed to the database accesses the database volume at the selected possible restoration state corresponding to the identified log record.

16. The non-transitory, computer-readable storage medium of claim 14,
wherein data for the database is stored in a database volume, and wherein a backup data store maintains a plurality of archived snapshots of the database volume;
wherein a respective restoration operation type for the selected possible restoration state is an archived snapshot restoration; and
wherein, in performing the restoration operation, the program instructions cause the one or more computing devices to implement:
obtaining from the backup data store an archived snapshot of the database volume of the plurality of archived snapshots that describes the selected possible restoration state associated with the indication;
providing the archived snapshot as a restored state for the database such that a subsequent access request directed to the database accesses the database volume at the selected possible restoration state according to the archived snapshot.

17. The non-transitory, computer-readable storage medium of claim 14, wherein the graphical representation further indicates one or more failure events for the database system that occurred within a given time period with respect to one or more of the one or more possible restoration states.

18. The non-transitory, computer-readable storage medium of claim 14, wherein the program instructions cause the one or more computing devices to further implement:
detecting a selection of a new time period different than a given time period associated with the time-based graphical representation of the information, wherein the new time period includes a different one or more possible restoration states, wherein respective operation types correspond to respective ones of the different one or more possible restoration states within the new time period;
updating the graphical representation to illustrate the different one or more possible restoration states of the database ordered within the new time period according to corresponding points in time of respective ones of the different one or more possible restoration states of the database, wherein the updated graphical representation indicates the respective operation types for respective ones of the different respective one or more possible restoration states within the new time period; and
providing the updated graphical representation to a user.

19. The non-transitory, computer-readable storage medium of claim 14, wherein the program instructions cause the one or more computing devices to further implement:
in response to receiving the indication associated with the selected possible restoration state:
providing, via an interface, a graphical user interface element to a user via which a corresponding restoration operation is configurable; and
in response to receiving a configuration selection via the graphical user interface element for the corresponding restoration operation associated with the selected possible restoration state, performing the corresponding restoration operation according to the configuration selection received.

20. The non-transitory, computer-readable storage medium of claim 14, wherein the graphical representation is configured to further provide one or more database system performance metrics for a time period t that corresponds to the plurality of possible restoration states.

* * * * *